(12) United States Patent
Hayakawa

(10) Patent No.: US 11,981,499 B2
(45) Date of Patent: May 14, 2024

(54) LOADING TOOL AND MEASURING CONTAINER KIT

(71) Applicant: NIPPON SHINYAKU CO., LTD., Kyoto (JP)

(72) Inventor: Masaki Hayakawa, Kanazawa (JP)

(73) Assignee: NIPPON SHINYAKU CO., LTD., Kyoto (JP)

( * ) Notice: Subject to any disclaimer, the term of this patent is extended or adjusted under 35 U.S.C. 154(b) by 0 days.

(21) Appl. No.: 17/605,611

(22) PCT Filed: Apr. 8, 2020

(86) PCT No.: PCT/JP2020/015819
§ 371 (c)(1),
(2) Date: Oct. 22, 2021

(87) PCT Pub. No.: WO2020/217994
PCT Pub. Date: Oct. 29, 2020

(65) Prior Publication Data
US 2022/0227567 A1    Jul. 21, 2022

(30) Foreign Application Priority Data
Apr. 23, 2019 (JP) .................... 2019-081980

(51) Int. Cl.
*B65D 83/04* (2006.01)
(52) U.S. Cl.
CPC ................. *B65D 83/0409* (2013.01)
(58) Field of Classification Search
CPC ......... B65D 83/04; B65D 83/0409; A61J 1/03
(Continued)

(56) References Cited

U.S. PATENT DOCUMENTS 716,257 A * 12/1902 Lunt .................... B65D 47/061
222/522
2,013,901 A * 9/1935 Shankland ................ A47F 1/10
221/132
(Continued)

FOREIGN PATENT DOCUMENTS

CA         2130881 A1 *  8/1994
EP         1847475 A2 * 10/2007  ......... B65D 47/0838
(Continued)

OTHER PUBLICATIONS

The International Bureau of WIPO, "International Preliminary Report on Patentability," issued in International Application No. PCT/JP2020/015819, of which U.S. Appl. No. 17/605,611 is a U.S. national phase entry, with a date of issuance of Sep. 28, 2021, 14 pages (9 pages of English translation of International Preliminary Report on Patentability and 5 pages of original International Preliminary Report on Patentability).
(Continued)

*Primary Examiner* — Rakesh Kumar

(57) ABSTRACT

A measuring container comprises a storage container and a storage section selector. The storage container includes storage sections each capable of storing a predetermined number of tablets. The storage section selector is attached to the storage container and has a second path that allows the tablets to pass through from one end to an other end. The one end of the second path is connected to an outside, and the other end is selectively connected to one of the storage sections.

6 Claims, 28 Drawing Sheets

(58) Field of Classification Search
USPC ....... 221/154, 266, 1, 246, 263, 152, 65, 64, 221/260, 303, 306, 151, 202, 68
See application file for complete search history.

(56) References Cited

U.S. PATENT DOCUMENTS

| | | | |
|---|---|---|---|
| 2,236,224 A | 3/1941 | Raschkind | |
| 2,275,566 A * | 3/1942 | Slaten | A47J 9/00 83/257 |
| 2,673,777 A * | 3/1954 | Ward | B65D 83/0409 221/200 |
| 2,683,554 A * | 7/1954 | Mulhauser, Jr. | B65D 83/0409 221/152 |
| 2,701,078 A | 2/1955 | Bowman | |
| 2,886,208 A * | 5/1959 | Sinclair | B65D 83/0481 221/288 |
| 2,886,209 A * | 5/1959 | Lermer | B65D 83/0409 222/452 |
| 2,919,796 A * | 1/1960 | Pressl | B25H 3/003 312/73 |
| 2,962,190 A * | 11/1960 | Horland | B65D 83/0409 221/202 |
| 3,159,308 A * | 12/1964 | Passavanti | B65D 83/0409 221/289 |
| 3,289,885 A * | 12/1966 | Villaveces | B65D 47/265 215/901 |
| 3,358,818 A * | 12/1967 | Davis | B65D 83/0481 206/536 |
| 3,527,383 A * | 9/1970 | Borsum | B65D 83/0409 221/122 |
| 3,586,208 A * | 6/1971 | Hussey | B65D 83/0409 221/302 |
| 3,622,041 A * | 11/1971 | Borsum | B65D 51/24 221/202 |
| 3,627,160 A * | 12/1971 | Horvath | B65D 50/061 215/206 |
| 3,836,055 A * | 9/1974 | Katzmark | G01F 11/261 222/455 |
| 4,150,766 A * | 4/1979 | Westendorf | B65D 83/0409 221/265 |
| 4,154,365 A * | 5/1979 | Lorca | B65D 83/0409 221/302 |
| 4,228,920 A | 10/1980 | Burton | |
| 4,230,236 A * | 10/1980 | Boulter | B65D 83/0409 221/281 |
| 4,282,990 A * | 8/1981 | Miyashita | G01F 11/261 222/362 |
| 4,283,000 A * | 8/1981 | White | B65D 5/722 229/148 |
| 4,288,006 A * | 9/1981 | Clover, Jr. | B65D 47/265 222/42 |
| 4,530,447 A * | 7/1985 | Greenspan | B65D 83/04 222/543 |
| 4,653,668 A * | 3/1987 | Gibilisco | B65D 83/0409 221/289 |
| 4,744,492 A * | 5/1988 | Hackmann | B65D 83/0409 221/204 |
| 4,805,765 A * | 2/1989 | Barrett | B65D 5/724 229/122 |
| 4,807,757 A * | 2/1989 | Rappaport | B65D 83/0409 221/133 |
| 4,848,593 A * | 7/1989 | Jeandaud | B65D 83/049 221/256 |
| 4,971,203 A * | 11/1990 | Weinstein | B65D 83/0481 206/536 |
| 5,018,644 A * | 5/1991 | Hackmann | B65D 83/0409 221/152 |
| 5,020,719 A * | 6/1991 | Roth | B65D 5/5213 221/302 |
| 5,108,006 A * | 4/1992 | Tieke | B65D 83/0409 221/152 |
| 5,405,047 A * | 4/1995 | Hansen | B65D 83/0409 221/289 |
| 5,443,204 A * | 8/1995 | O'Donnell | B65D 5/724 229/122 |
| 5,467,903 A * | 11/1995 | Sorensen | G01F 11/261 222/455 |
| 5,540,266 A | 7/1996 | Grau et al. | |
| 5,667,097 A * | 9/1997 | Joyce | B65D 83/0409 221/93 |
| 6,267,265 B1 * | 7/2001 | Issa | B65D 83/0409 222/536 |
| 6,763,971 B1 * | 7/2004 | Tong | G07F 11/44 221/151 |
| 6,824,011 B1 * | 11/2004 | Woempner | F41B 11/50 221/265 |
| 7,240,795 B2 * | 7/2007 | Lee | B65D 25/04 206/534 |
| 7,424,960 B1 * | 9/2008 | Vokac | G07D 1/08 221/121 |
| 9,150,346 B1 * | 10/2015 | Aramian | A61J 7/04 |
| 9,656,796 B1 * | 5/2017 | Cammarata | B65D 83/0409 |
| 10,099,841 B2 * | 10/2018 | Reinhold | B65D 83/0409 |
| 10,364,089 B2 * | 7/2019 | Daniels, Jr. | B65D 25/20 |
| 10,744,068 B2 * | 8/2020 | Sita | A61J 7/0084 |
| 10,758,455 B2 * | 9/2020 | Fisher | A61J 7/0084 |
| 11,744,778 B2 * | 9/2023 | Israeli | A61J 7/0076 221/277 |
| 2002/0036209 A1 * | 3/2002 | Chang | G07F 11/54 221/121 |
| 2004/0124204 A1 * | 7/2004 | Giraud | B65D 83/0409 221/263 |
| 2008/0011773 A1 * | 1/2008 | Tobias | B65D 83/0409 221/264 |
| 2008/0251531 A1 * | 10/2008 | Coe | B65D 83/0454 221/265 |
| 2009/0194556 A1 * | 8/2009 | Klein | B65D 83/0409 221/266 |
| 2011/0147404 A1 * | 6/2011 | Dobie, III | B65D 47/265 221/303 |
| 2011/0192863 A1 * | 8/2011 | Barrass | A61J 7/0084 221/92 |
| 2012/0006700 A1 * | 1/2012 | Geboers | A61J 7/0445 206/216 |
| 2014/0339250 A1 * | 11/2014 | Dalpian | B65D 83/0418 221/133 |
| 2017/0036846 A1 * | 2/2017 | Bressan | B65D 85/60 |
| 2017/0242976 A1 | 8/2017 | Howieson et al. | |
| 2020/0189833 A1 * | 6/2020 | French | A61J 1/03 |

FOREIGN PATENT DOCUMENTS

| | | | |
|---|---|---|---|
| GB | 364159 A * | 1/1932 | ......... B65D 83/0409 |
| GB | 364159 A | 1/1932 | |
| JP | S41-023738 Y1 | 12/1966 | |
| JP | S43-011088 Y1 | 5/1968 | |
| JP | S48-003004 Y1 | 1/1973 | |
| JP | S48-007450 U | 1/1973 | |
| JP | S53-089581 A | 8/1978 | |
| JP | S53-146652 U | 11/1978 | |
| JP | S54-063987 A | 5/1979 | |
| JP | S55-067482 U | 5/1980 | |
| JP | H05-044877 U | 6/1993 | |
| JP | H08-002510 A | 1/1996 | |
| JP | 2008-133001 A | 6/2008 | |
| JP | 2009-098926 A | 5/2009 | |
| JP | 2010-047298 A | 3/2010 | |
| JP | 2011-046439 A | 3/2011 | |
| JP | 2011-093596 A | 5/2011 | |
| JP | 2015-067308 A | 4/2015 | |
| JP | 2016-011145 A | 1/2016 | |
| JP | 2017-534540 A | 11/2017 | |
| JP | 2019-043590 A | 3/2019 | |
| JP | 2020-097427 A | 6/2020 | |
| WO | WO-2009149268 A1 * | 12/2009 | ......... B65D 83/0427 |
| WO | WO-2013172487 A1 * | 11/2013 | ............ A61J 7/0076 |

(56) References Cited

FOREIGN PATENT DOCUMENTS

| WO | 2016/059428 | A2 | | 4/2016 | |
| WO | WO-2020217994 | A1 | * | 10/2020 | ......... B65D 83/0409 |

OTHER PUBLICATIONS

European Patent Office, "Extended European Search Report", issued in European Patent Application No. 20 796 264.8, which is a counterpart to U.S. Appl. No. 17/605,611, filed Dec. 15, 2022, 8 pages.

The International Bureau of WIPO, "International Preliminary Report on Patentability," issued in International Application No. PCT/JP2021/040115 with a date of issuance of May 2, 2023, 10 pages (7 pages of English translation of International Preliminary Report on Patentability and 3 pages of original International Preliminary Report on Patentability).

The International Bureau of WIPO, "International Preliminary Report on Patentability," issued in International Application No. PCT/JP2022/015926, of which U.S. Appl. No. 18/555,200 is a U.S. national phase entry, with a date of issuance of Oct. 12, 2023, 11 pages (8 pages of English translation of International Preliminary Report on Patentability and 3 pages of original International Preliminary Report on Patentability).

Japan Patent Office (ISA/JP), "International Search Report," issued in International Application No. PCT/JP2020/015819, of which U.S. Appl. No. 17/605,611 is a U.S. national phase entry, with a date of mailing of Jul. 7, 2020, 6 pages (3 pages of English translation of International Search Report and 3 pages of original International Search Report).

Japan Patent Office (ISA/JP), "International Search Report," issued in International Application No. PCT/JP2021/040115 with a date of mailing of Dec. 14, 2021, 4 pages (2 pages of English translation of International Search Report and 2 pages of original International Search Report).

Japan Patent Office (ISA/JP), "International Search Report," issued in International Application No. PCT/JP2022/015926, of which U.S. Appl. No. 18/555,200 is a U.S. national phase entry, with a date of mailing of May 10, 2022, 4 pages (2 pages of English translation of International Search Report and 2 pages of original International Search Report).

Japan Patent Office, "Notice of Reasons for Refusal", issued in Japanese Patent Application No. 2019-081980, which is a counterpart to U.S. Appl. No. 17/605,611, mailed on Mar. 28, 2023, 11 pages (5 pages of English translation of Notice of Reasons for Refusal, and 6 pages of original Notice of Reasons for Refusal).

* cited by examiner

LOADING TOOL AND MEASURING CONTAINER KIT

CROSS-REFERENCE TO RELATED APPLICATIONS

This is a national phase application in the United States of International Patent Application No. PCT/JP2020/015819 with an international filing date of Apr. 8, 2020, which claims priority of Japanese Patent Application No. 2019-081980 filed on Apr. 23, 2019.

TECHNICAL FIELD

The present invention relates to a measuring container, a loading tool, and a measuring container kit for dispensing a predetermined number of tablets.

BACKGROUND ART

There has been a high demand for containers and container caps for dispensing a predetermined number of contents in a container, and various containers and caps have been developed. For example, JP 2015-67308 A and JP 2019-43590 A each disclose a quantitative extraction tablet container capable of extracting a predetermined number of tablets contained in the container at a time.

SUMMARY OF THE INVENTION

Problems to be Solved by the Invention

For example, for pharmaceutical doses, multiple tablets of six or more may need to be taken at a time. However, J P 2015-67308 A only discloses a quantitative extraction container for extracting, for example, three tablets at a time, and JP 2019-43590 A only discloses a quantitative extraction container for extracting, for example, five tablets at a time. It is difficult to change the design of the quantitative extraction containers of JP 2015-67308 A and JP 2019-43590 A to extract a large number of tablets of six or more at a time because the quantitative extraction containers have to be larger.

The present invention has been made to solve the above problem, and an object thereof is to provide a measuring container for dispensing a predetermined number of tablets.

Means for Solving the Problems

One aspect of the present invention provides a measuring container for dispensing a predetermined number of tablets. The measuring container includes: a storage container including storage sections each capable of storing the predetermined number of tablets; and a storage section selector attached to the storage container. The storage section selector has a second path which allows the tablets to pass through the second path from one end to an other end. The one end of the second path is connected to an outside thereof, and the other end is selectively connected to one of the storage sections.

Another aspect of the present invention provides a loading tool for loading tablets into the measuring container of the above aspect. The loading tool includes a first path connected to the storage section so that the first path allows a tablet from the outside to pass through the first path to the storage section. The loading tool is detachably attached to the storage container.

Still another aspect of the present invention provides a measuring container kit including the measuring container of the above aspect and the loading tool of the above aspect.

Effects of the Invention

According to the present invention, a measuring container from which a predetermined number of contents of the container can be dispensed out is obtained.

MODE(S) FOR CARRYING OUT THE INVENTION

Figure 1:
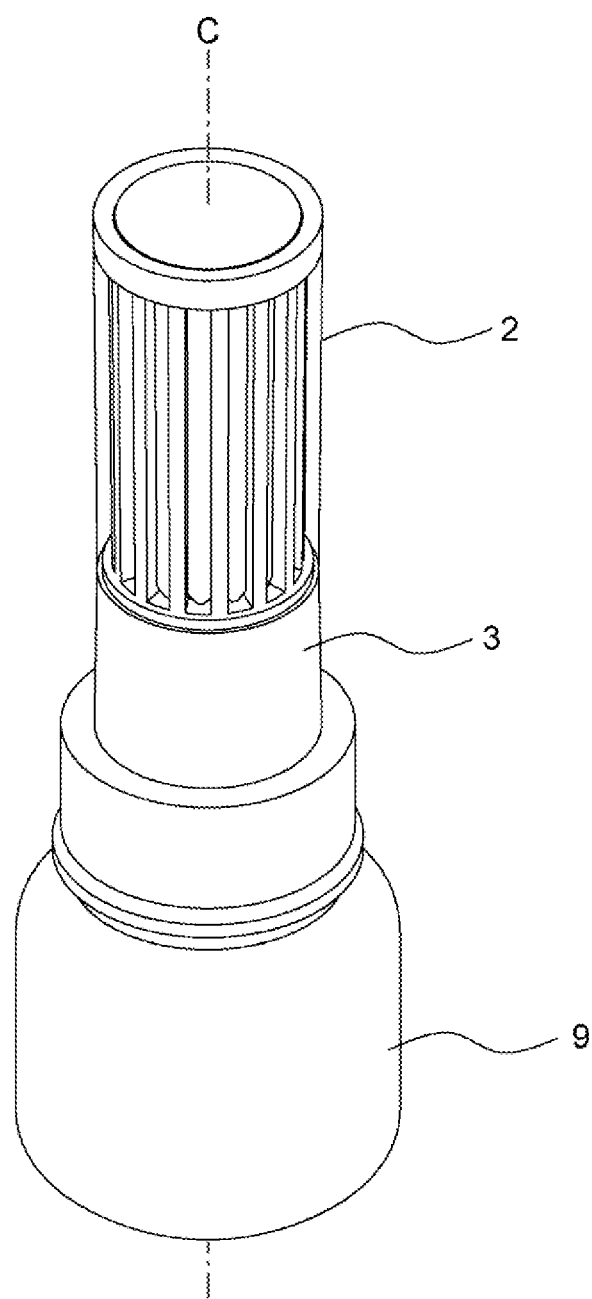
FIG. 1 is a perspective view illustrating a state where a pocket part and a loading tool according to an embodiment of the present invention are attached to a tablet container.

Hereinafter, a measuring container and a loading tool according to an embodiment of the present invention will be described with reference to the drawings. A measuring container according to an embodiment of the present invention includes a pocket part and a hinge cap. In each embodiment, the same components are denoted by the same reference numerals, and the description thereof will be omitted.

1. STRUCTURE

1-1. Overview

Figure 2:
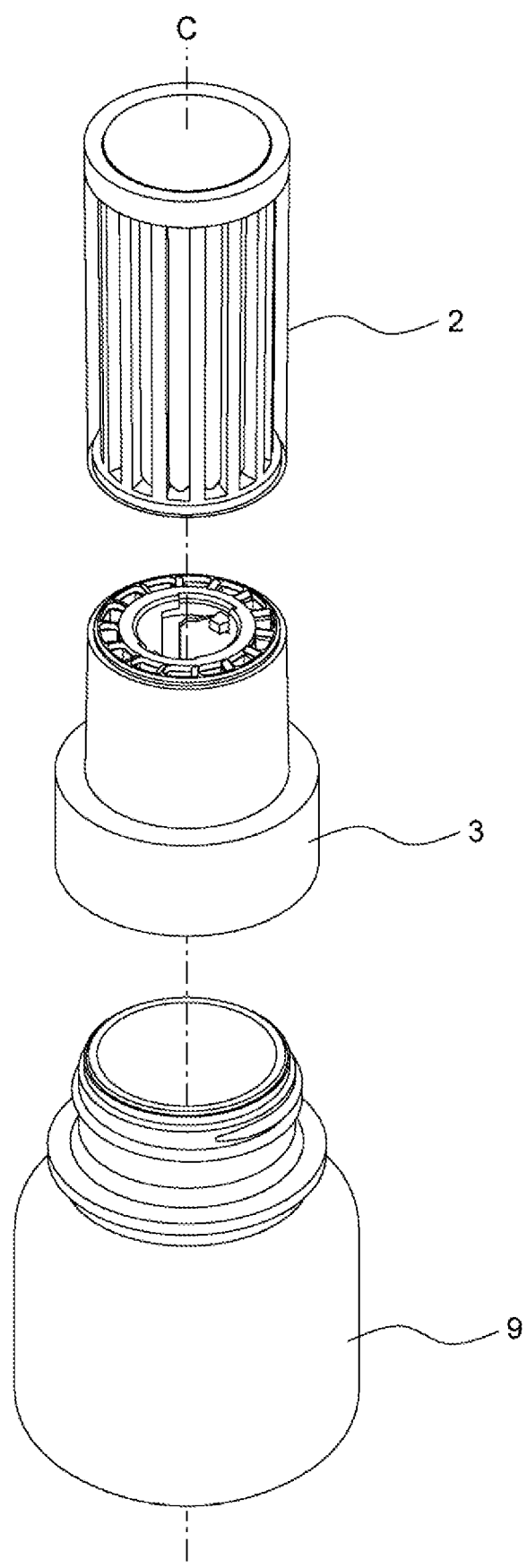
FIG. 2 is an exploded perspective view of the pocket part, the loading tool, and the tablet container illustrated in FIG. 1.

FIG. 1 is a perspective view illustrating a state in which a pocket part 2 and a loading tool 3 according to an embodiment of the present invention are attached to a tablet container 9. FIG. 2 is an exploded perspective view of the pocket part 2, the loading tool 3, and the tablet container 9.

In FIGS. 1 and 2, a central axis C is illustrated for convenience of description. In the present specification, a direction parallel to the central axis C is referred to as an axial direction, a direction perpendicular to the axial direction is referred to as a radial direction, and a circumferential direction around the central axis C is referred to as a circumferential direction. In the axial direction, a direction upward in the plane of the drawing is defined as a positive direction. The positive direction in the axial direction is also referred to as an upward direction, and a negative direction in the axial direction is also referred to as a downward direction.

The loading tool 3 is detachably attached to the tablet container 9 by a screw. The pocket part 2 is fitted and attached to the loading tool 3. The pocket part 2 is an example of a "storage container" of the present disclosure. For example, tablets are stored in the tablet container 9. A tablet is an example of a "content" of the present disclosure. As illustrated in FIG. 1, when the pocket part 2, the loading tool 3, and the tablet container 9 are inverted in an assembled state, the tablets in the tablet container 9 are loaded into the pocket part 2.

1-2. Pocket Part

Figure 3:
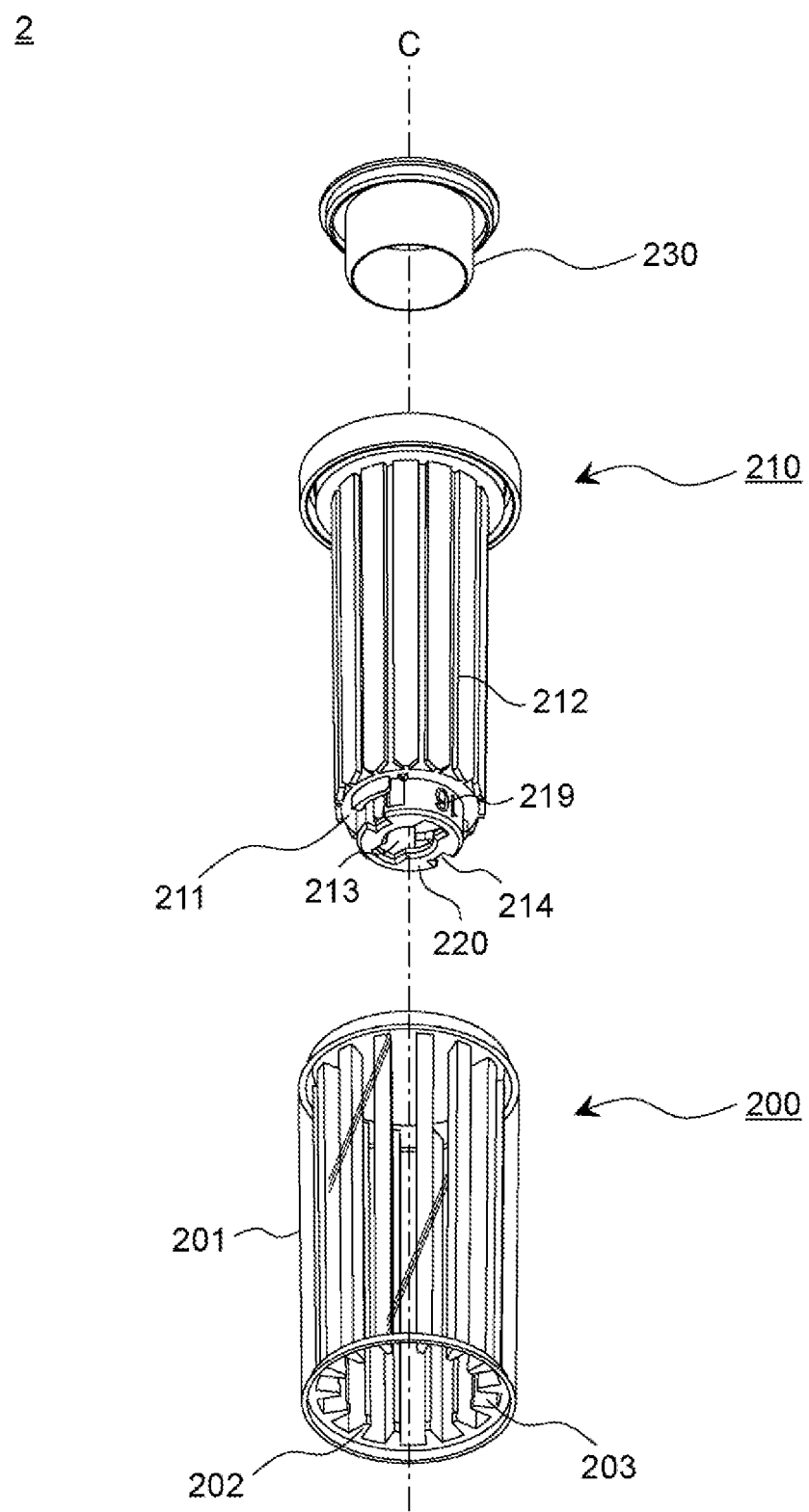
FIG. 3 is an exploded perspective view of the pocket part according to the present embodiment.

FIG. 3 is an exploded perspective view of the pocket part 2. The pocket part 2 includes an outer cylinder 200 and an inner cylinder 210.

The outer cylinder 200 includes a cylindrical peripheral wall 201 centered on the central axis C and partition ribs 202 each protruding radially inward from a radially inner surface of the peripheral wall 201. The partition ribs 202 extend in the axial direction over substantially an entire length of the outer cylinder 200. In the illustrated example, the outer cylinder 200 includes 14 partition ribs 202. The peripheral wall 201 may be formed of a transparent material to confirm the number of tablets.

The inner cylinder 210 includes a cylindrical peripheral wall 211 centered on the central axis C. A radially inner side of the peripheral wall 211 is hollow. On a surface of the radially outer side of the peripheral wall 211, 14 grooves 212 extending in the axial direction are formed at equal intervals in the circumferential direction. When the inner cylinder 210 and the outer cylinder 200 are assembled, the partition ribs 202 of the outer cylinder 200 slide in the grooves 212 of the inner cylinder 210 in the axial direction. The partition rib 202 of the outer cylinder 200 and the groove 212 of the inner cylinder 210 engage with each other, so that the outer cylinder 200 does not rotate in the circumferential direction with respect to the inner cylinder 210.

The partition ribs 202 adjacent to each other in the circumferential direction form pockets 203 that can store tablets between the partition ribs in the circumferential direction. Each of the pockets 203 has a dimension to store just 16 tablets arranged in a row in the axial direction. For example, an axial length of the pocket 203 is approximately equal to a tablet diameter multiplied by 16.

The inner cylinder 210 has a top plate portion 220 having a disk-shape at a lower end. The top plate portion 220 is an upper end of the inner cylinder 210 at the time of use described later. An opening 213 is formed in the top plate portion 220. A joint part 410 of a hinge cap 4 to be described later is inserted into the opening 213, and the opening 213 is used to fix the hinge cap 4.

A groove portion 214 extending in the axial direction is formed in a vicinity of a lower end of the inner cylinder 210. In the illustrated example, two groove portions 214 are formed. The two groove portions 214 are disposed at positions facing each other across the central axis C. A guide projection 305 of a main body 300 of the loading tool 3 is inserted into each of the groove portions 214 from the axial direction in an assembly operation described later. As described above, the groove portion 214 is used for fixing the main body 300 of the loading tool 3.

On a surface near the lower end of the inner cylinder 210, a tablet number mark 219 indicating the number of tablets stored in one pocket 203 may be displayed. As a result, an operator or a user can easily know the number of tablets stored in one pocket 203, that is, without actually counting the number of tablets stored in the pocket 203.

The pocket part 2 may include a lid 230 for closing the opening at the upper end of the inner cylinder 210.

1-3. Loading Tool

Figure 4:
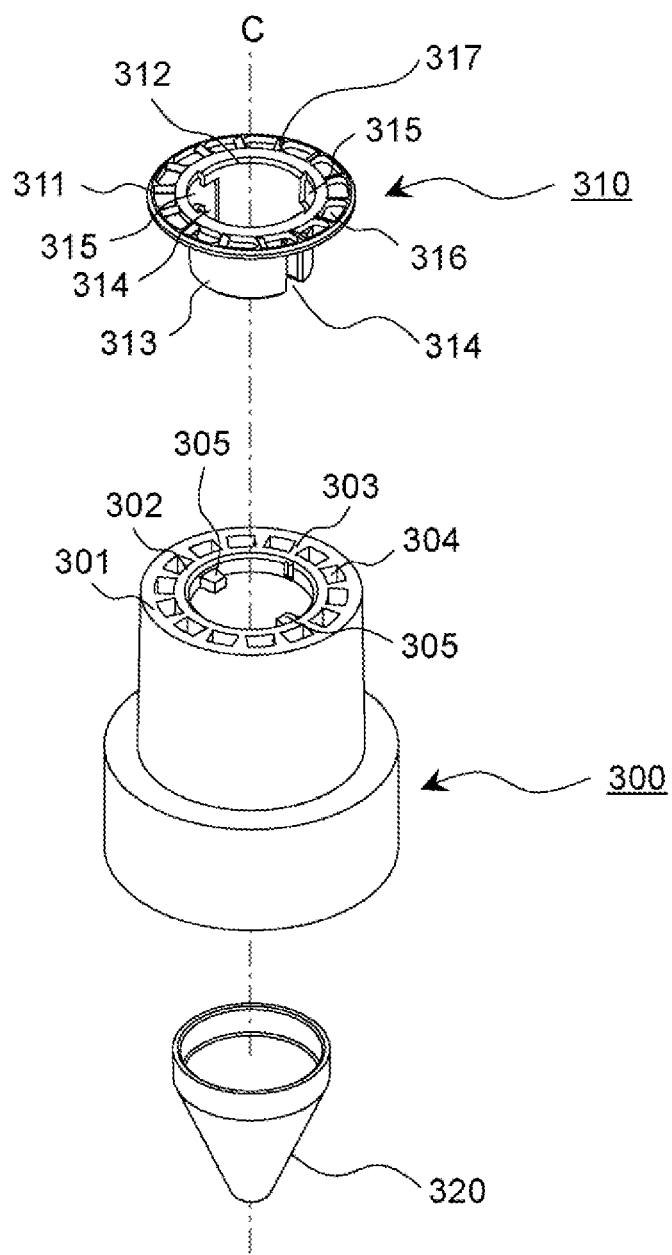
FIG. 4 is an exploded perspective view of the loading tool according to the present embodiment.

Next, the loading tool 3 will be described with reference to FIG. 4. FIG. 4 is an exploded perspective view of the loading tool 3. The loading tool 3 includes the main body 300, an opening/closing part 310, and a lid 320.

The main body 300 includes a cylindrical outer peripheral wall 301 centered on the central axis C and an inner peripheral wall 302 centered on the central axis C and having a radius smaller than that of the outer peripheral wall 301. Between the outer peripheral wall 301 and the inner peripheral wall 302, 14 partitions 303 extending in the radial direction are formed. The outer peripheral wall 301, the inner peripheral wall 302, and two partitions 303 adjacent to each other in the circumferential direction integrally form a path 304. Thus, the main body 300 has 14 paths 304.

Each of the paths 304 is designed to be dimensioned for only one tablet to pass through. That is, a difference between a radius of a radially inner surface of the outer peripheral wall 301 and a radius of a radially outer surface of the inner peripheral wall 302, and a circumferential distance between the two partitions 303 adjacent to each other, are designed so that only one tablet can pass through the path 304 (that is, no two tablets can pass through at the same time).

The lid 320 is fitted to a lower end of the inner peripheral wall 302 of the main body 300. As a result, the paths for tablets from the tablet container 9 below the loading tool 3 to an inside of the inner peripheral wall 302 of the loading tool 3 are blocked. A tablet from the tablet container 9 passes between the outer peripheral wall 301 and the inner peripheral wall 302 without passing through a hollow portion of the main body 300 located radially inward from the inner peripheral wall 302.

The guide projection 305 extending from a radially inner surface of the inner peripheral wall 302 toward the central axis C is formed at an upper end of the inner peripheral wall 302 of the main body 300. In the illustrated example, two guide projections 305 are formed. The two guide projections 305 are disposed at positions facing each other across the central axis C. The guide projections 305 of the main body 300 are fitted into guide groove portions 314 of the opening/closing part 310 described later.

The opening/closing part 310 has a function of switching between a closed state of the loading tool 3, where all the paths 304 are blocked to prevent a movement of the tablets in the axial direction via the paths 304, and an open state where all the paths 304 are released to enable the movement of the tablets in the axial direction via the paths 304.

The opening/closing part 310 includes a disk-shaped top plate portion 311 centered on the central axis C. The top plate portion 311 is provided with a circular opening 312 centered on the central axis C. The opening/closing part 310 further includes a peripheral wall 313 extending downward from a peripheral edge of the opening 312 of the top plate portion 311. The peripheral wall 313 has a cylindrical shape centered on the central axis C.

A distance (radius) from the central axis C to a radially outer surface of the peripheral wall 313 of the opening/closing part 310 is smaller than a distance (radius) from the central axis C to the radially inner surface of the inner peripheral wall 302 of the main body 300. Therefore, when the opening/closing part 310 is placed on the main body 300, the peripheral wall 313 of the opening/closing part 310 is inserted into the inner peripheral wall 302 of the main body 300. In order to insert the peripheral wall 313 of the opening/closing part 310 into the inner peripheral wall 302 of the main body 300 without a gap, the distance (radius) from the central axis C to the radially outer surface of the peripheral wall 313 of the opening/closing part 310 may be substantially the same as the distance (radius) from the central axis C to the radially inner surface of the inner peripheral wall 302 of the main body 300.

A guide groove portion 314 is formed in the peripheral wall 313 of the opening/closing part 310. The guide groove portion 314 is a slit extending in the axial direction. In the illustrated example, two guide groove portions 314 are formed. The two guide groove portions 314 are disposed at positions facing each other across the central axis C. When the opening/closing part 310 is placed on the main body 300 and assembled, each of the guide projections 305 of the main body 300 is fitted into each of the guide groove portions 314 of the opening/closing part 310. That is, only when each of the guide groove portions 314 of the opening/closing part 310 and each of the guide projections 305 of the main body 300 are at predetermined relative positions in the circumferential direction, the guide projection 305 of the main body 300 can be fitted into the guide groove portion 314 of the opening/closing part 310. As described above, the guide groove portion 314 of the opening/closing part 310 and the guide projection 305 of the main body 300 have a positioning function of determining a relative position between the opening/closing part 310 and the main body 300.

Cutout portions 315 each extending in the circumferential direction is formed at an upper end of the guide groove portion 314 of the opening/closing part 310. Thus, after being assembled, the opening/closing part 310 can rotate about the central axis C by a predetermined angle with respect to the main body 300. A state of the loading tool 3 before rotation corresponds to the above-described open state, and a state after rotation corresponds to the closed state. In this manner, the opening/closing part 310 can switch between the open state before rotation and the closed state after rotation with respect to the main body 300.

In the top plate portion 311 of the opening/closing part 310, paths 316 are formed. The paths 316 are 14 openings arranged in the circumferential direction. A radially extending portion between the paths 316 adjacent to each other in the circumferential direction is referred to as a stopper 317. The opening/closing part 310 includes 14 stoppers 317. Each of the paths 316 is designed to be dimensioned for only one tablet to pass through.

In the open state of the loading tool 3, the path 316 of the opening/closing part 310 overlaps the path 304 of the main body 300 in the axial direction. Therefore, in the open state of the loading tool 3, a tablet can move in the axial direction through a path 316 of the opening/closing part 310 and a path 304 of the main body 300.

In the closed state of the loading tool 3, each stopper 317 of the opening/closing part 310 closes the corresponding path 304 of the main body 300. As a result, all of the paths 304 of the main body 300 are blocked, and the tablets cannot move in the axial direction through the paths 304 of the main body 300.

1-4. Hinge Cap

As described above, when the pocket part 2, the loading tool 3, and the tablet container 9 are inverted in the assembled state as illustrated in FIG. 1, the tablets in the tablet container 9 are loaded into the pocket part 2.

Figure 5:
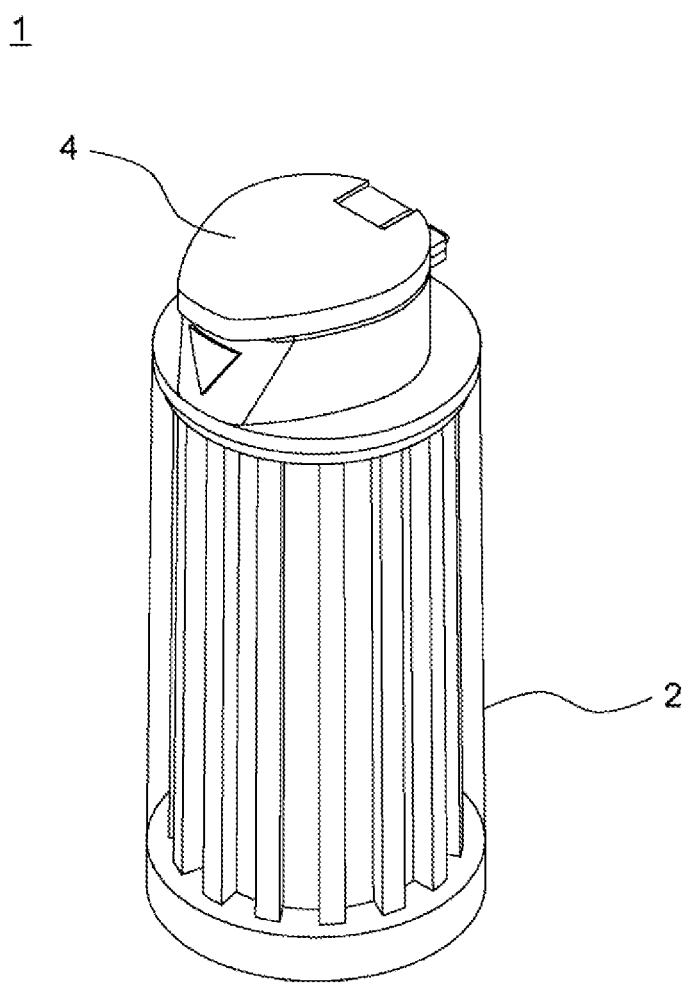
FIG. 5 is a perspective view illustrating a measuring container according to the present embodiment.
Figure 6:
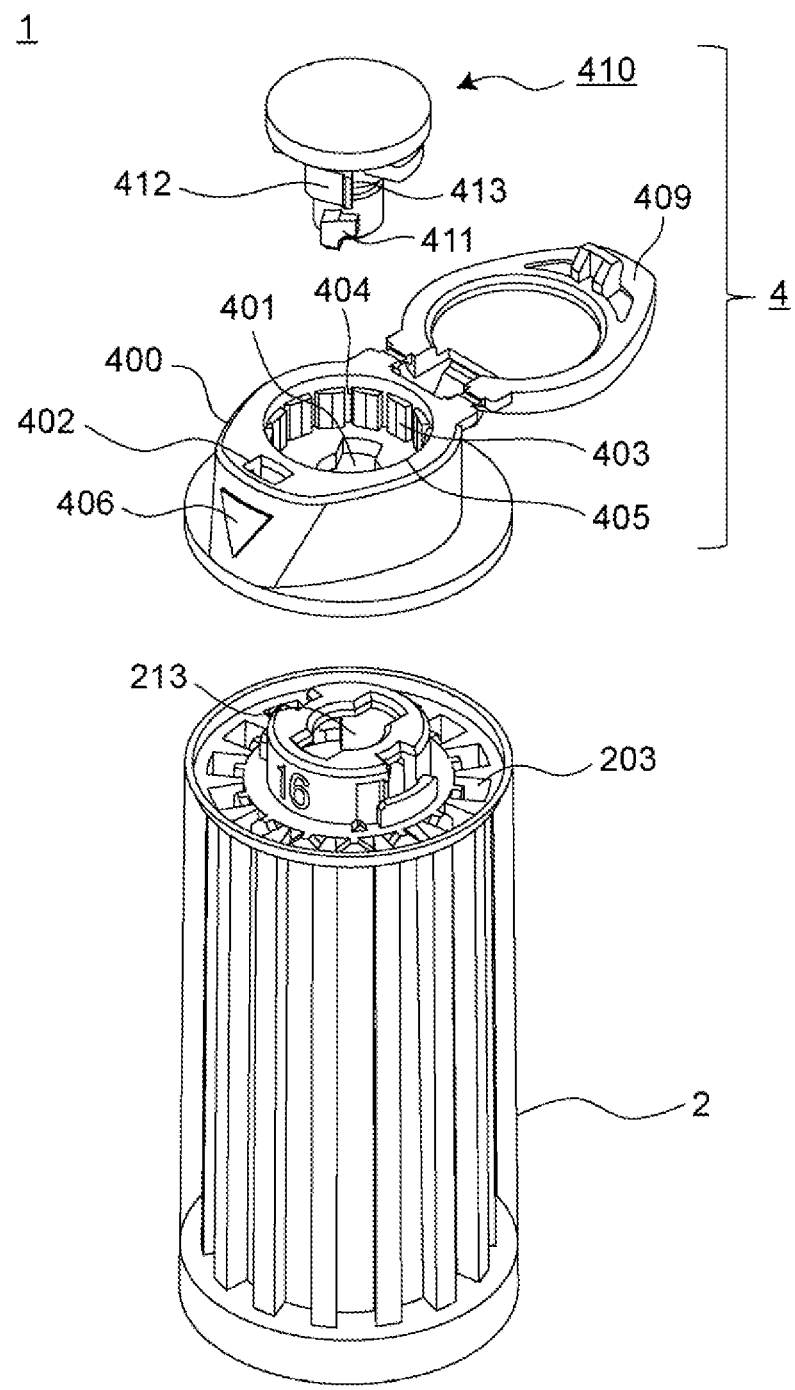
FIG. 6 is an exploded perspective view of the measuring container of FIG. 5.

FIG. 5 is a perspective view illustrating the measuring container 1 according to the present embodiment. The measuring container 1 includes a pocket part 2 and a hinge cap 4 attached to the pocket part 2 to cover the pocket part 2. In FIG. 5, the hinge cap 4 is closed. FIG. 6 is an exploded perspective view of the measuring container 1 of FIG. 5. In FIG. 6, the hinge cap 4 is open.

As illustrated in FIG. 6, the hinge cap 4 includes a main body 400 and a joint part 410 for coupling the main body 400 to the pocket part 2. An opening 401 is formed in the main body 400. The joint part 410 is inserted into both the opening 401 and an opening 213 of the pocket part 2, and couples the main body 400 of the hinge cap 4 and the pocket part 2 so as not to be separated in the axial direction. As described later, the main body 400 of the hinge cap 4 is coupled to the pocket part 2 so as to be rotatable in the circumferential direction about the central axis C.

A path 402 for tablets, which is an opening, is formed in the main body 400 of the hinge cap 4. The path 402 is designed to be dimensioned to allow tablets to pass therethrough. A tablet loaded in each pocket 203 of the pocket part 2 can exit via the path 402 to an outside when the path 402 is properly aligned with the pocket 203. A mark 406 indicating a position of the path 402 is formed on a surface of the main body 400 on a radially outer side of the path 402. In the illustrated example, the mark 406 has an inverted triangular shape with a vertex facing downward. The mark 406 allows the user to know a position of the path 402. The path 402 is closed by closing a cap portion 409.

The hinge cap 4 is an example of the "storage section selector" of the present disclosure.

A cylindrical cavity 405 is formed in an upper portion of the opening 401. A radially inner wall surface of the main body 400 is an edge of the cavity 405. On the radially inner wall surface of the main body 400, 14 protrusions 403 protruding radially inward from the inner wall surface are formed. A region between the protrusions 403 adjacent to each other in the circumferential direction is referred to as a groove 404. The groove 404 is a groove extending in the axial direction.

The joint part 410 is formed with a claw 412 protruding radially outward. The joint part 410 has two claws 412 at positions facing each other with the central axis C interposed therebetween. Each of the claws 412 protrudes radially outward from the joint part 410 and then bends counterclockwise. The claw 412 thus has a circumferentially-oriented end 413.

When the main body 400 of the hinge cap 4 and the joint part 410 are assembled, a tip of the claw 412 of the joint part 410 is fitted into the groove 404 of the main body 400. The groove 404 of the main body 400 and the claw 412 of the joint part 410 constitute a ratchet mechanism, and the main body 400 can rotate counterclockwise with respect to the joint part 410, but cannot rotate clockwise.

2. OPERATION

An operation of the pocket part 2 and the loading tool 3 assembled as described above will be described with reference to FIGS. 7 to 36.

2-1. Assembling Operation

Figure 7:
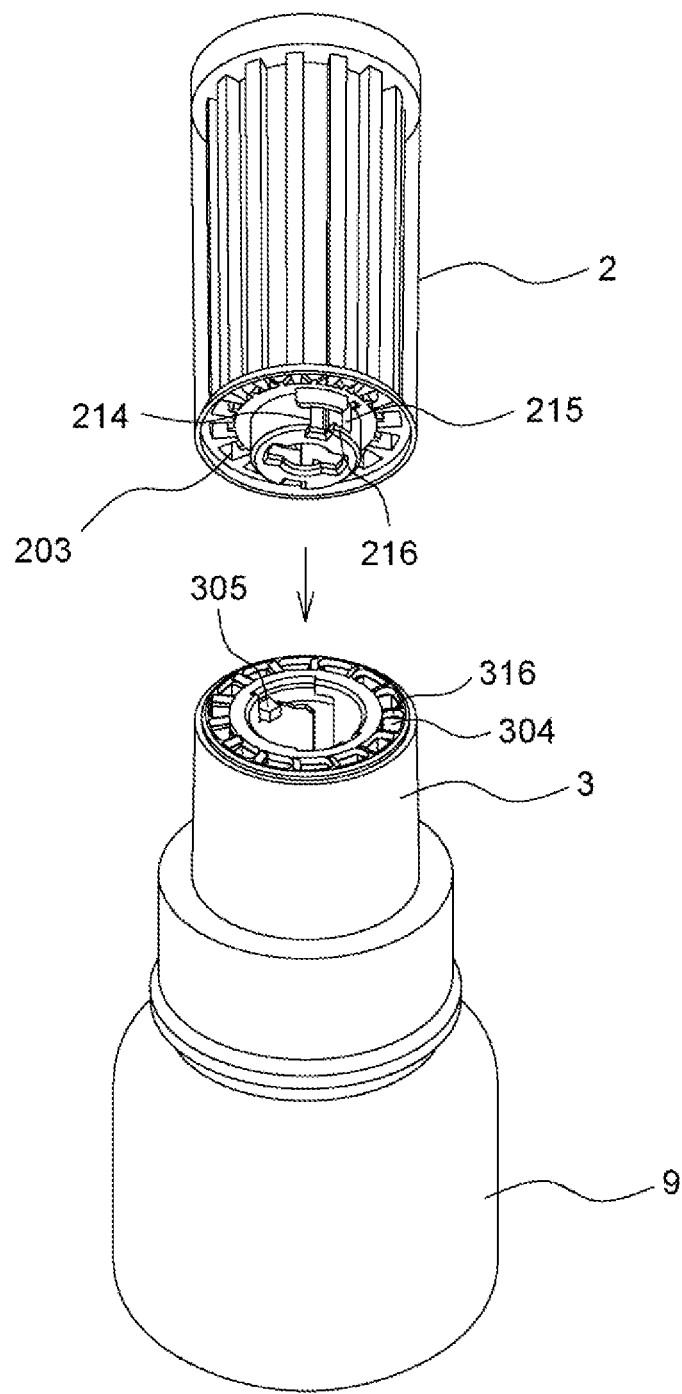
FIG. 7 is a diagram for explaining an assembling operation.

As illustrated in FIG. 7, the operator further puts the pocket part 2 on the loading tool 3 attached to the tablet container 9. The operator is a person who loads tablets into the pocket part 2 to prepare for use, and is, for example, a medical worker such as a doctor or a pharmacist. When the pocket part 2 is put on the loading tool 3, the guide projection 305 of the main body 300 of the loading tool 3 is inserted into the groove portion 214 of the inner cylinder 210 of the pocket part 2 from the axial direction.

Thereafter, the operator rotates the pocket part 2 clockwise with respect to the loading tool 3. When the pocket part 2 rotates clockwise with respect to the loading tool 3, the guide projection 305 of the loading tool 3 comes into contact with a wall surface 215 at a circumferential end of the groove portion 214 of the pocket part 2. The pocket part 2 does not rotate further clockwise with respect to the loading tool 3. This state corresponds to the above-described open state. In the open state, the tablet container 9 and the loading tool 3 are assembled as illustrated in FIG. 1. In the open state, the paths 304 of the main body 300 of the loading tool 3, the paths 316 of the opening/closing part 310 of the loading tool 3, and the pockets 203 of the pocket part 2 are aligned in straight lines. Accordingly, the tablets can move from the tablet container 9 to the pockets 203 of the pocket part 2.

In the open state, underneath the guide projection 305 of the loading tool 3, there is a protrusion 216 of the groove portion 214 of the pocket part 2 protruding radially outward. Therefore, there is a resistance to rotate the pocket part 2 counterclockwise, and the top plate portion 220 of the pocket part 2 obstructs the guide projection 305 of the loading tool 3, so that the pocket part 2 cannot move axially upward with respect to the loading tool 3. Therefore, in the open state, unless a force of a predetermined magnitude for rotating the pocket part 2 counterclockwise is applied, the pocket part 2 is not separated from the loading tool 3.

2-2. Tablet Loading Operation

Figure 8:
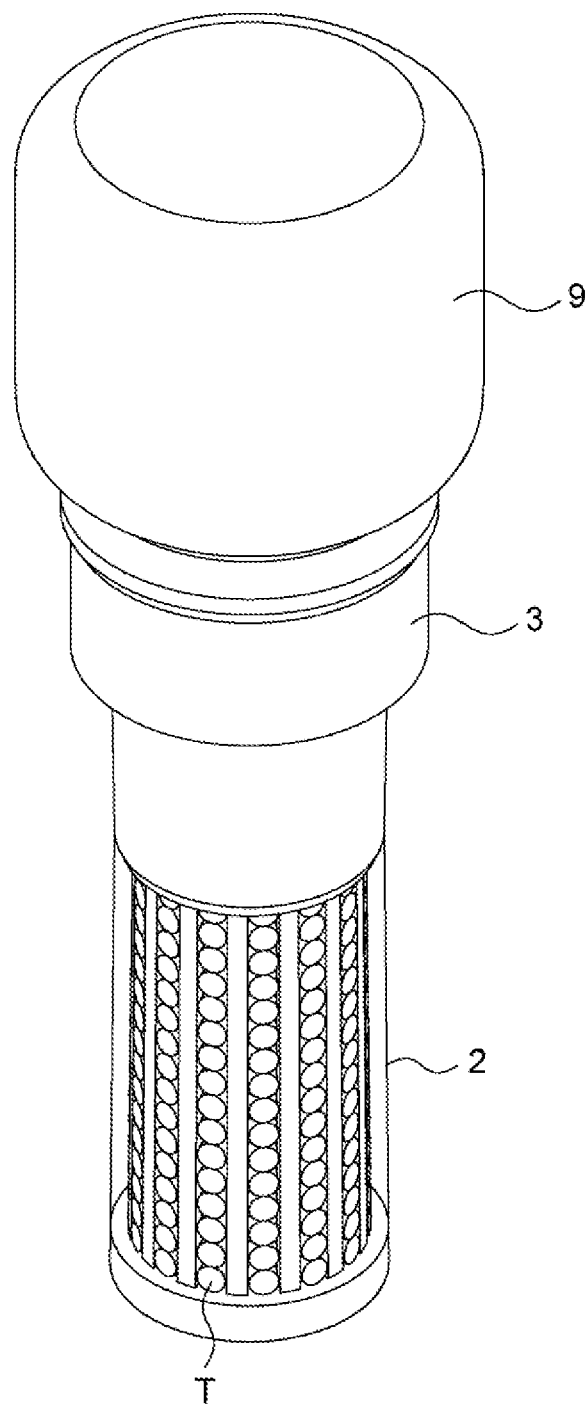
FIG. 8 is a diagram for explaining a tablet loading operation.
Figure 9:
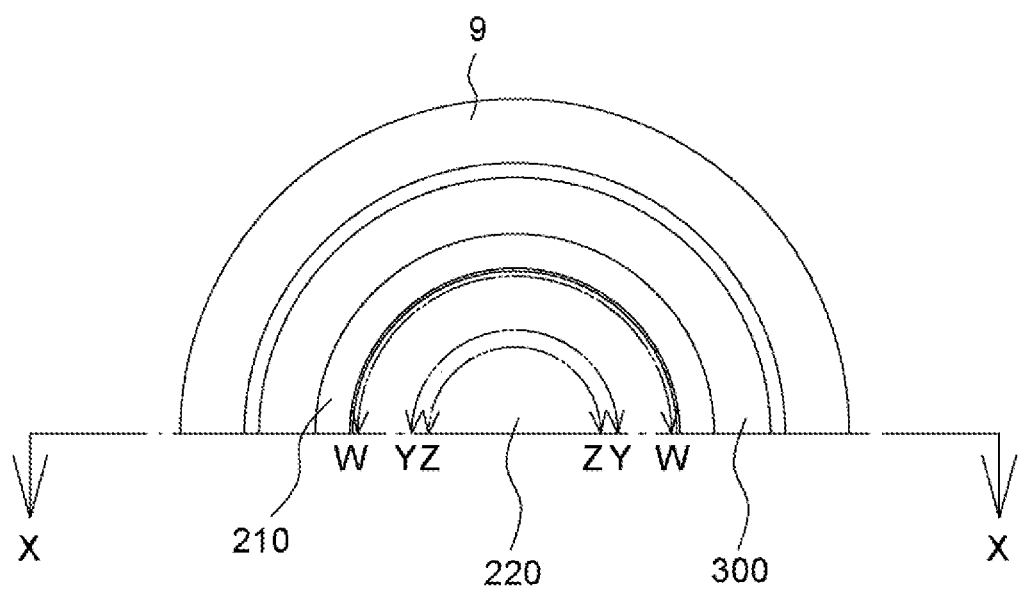
FIG. 9 is a bottom view of the pocket part, the loading tool, and the tablet container of FIG. 8 as viewed from below of a paper surface of FIG. 8.
Figure 10:
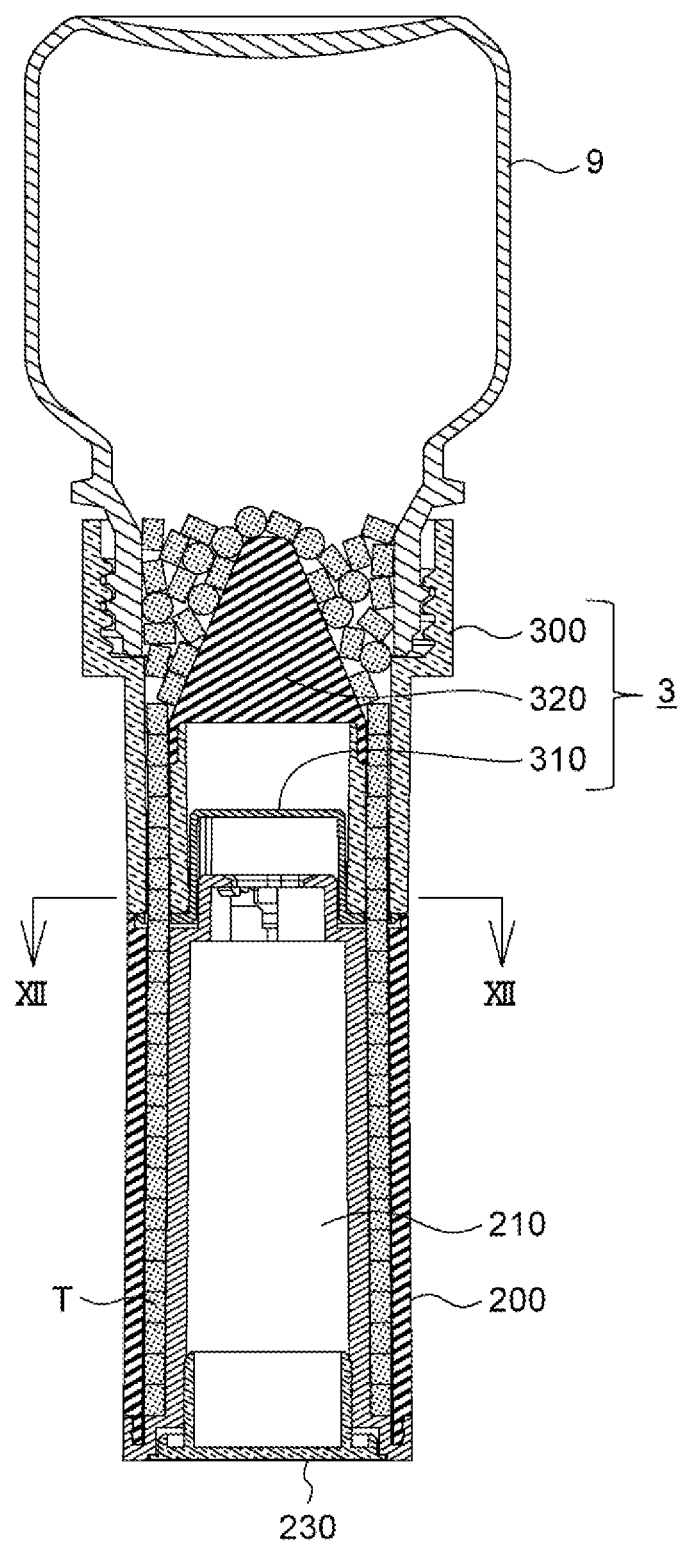
FIG. 10 is a cross-sectional view of the pocket part, the loading tool, and the tablet container of FIG. 9 as viewed in an X-X direction.

When the pocket part 2, the loading tool 3, and the tablet container 9 as illustrated in FIG. 1 are inverted in the open state, the tablets in the tablet container 9 are loaded into the pocket part 2. FIG. 8 is a perspective view illustrating the pocket part 2, the loading tool 3, and the tablet container 9 in the inverted state (and open state). FIG. 9 is a bottom view of the pocket part 2, the loading tool 3, and the tablet container 9 of FIG. 8 as viewed from below on a paper surface of FIG. 8. FIG. 10 is a cross-sectional view of the pocket part 2, the loading tool 3, and the tablet container 9 in FIG. 9 as viewed in an X-X direction.

As illustrated in FIGS. 8 and 10, tablets T each in a columnar shape are loaded in the pocket part 2 such that a thickness direction thereof is perpendicular to the central axis C. The dimensions of the pockets 203 (FIG. 3) of the pocket part 2, the paths 316 of the opening/closing part 310 of the loading tool 3, and the paths 304 (FIG. 4) of the main body 300 of the loading tool 3 are designed so that the tablets T cannot pass unless the thickness direction of each of the tablets T is perpendicular to the central axis C. When the tablets T are loaded into the pocket part 2, the lid 320 of the loading tool 3 has a function of adjusting an orientation of each of the tablets T such that the thickness direction of the tablet is perpendicular to the central axis C.

In order to load the tablets T into the pocket part 2, the operator may lightly shake the pocket part 2, the loading tool 3, and the tablet container 9 in the inverted state.

2-3. Separation Operation

Figure 11:
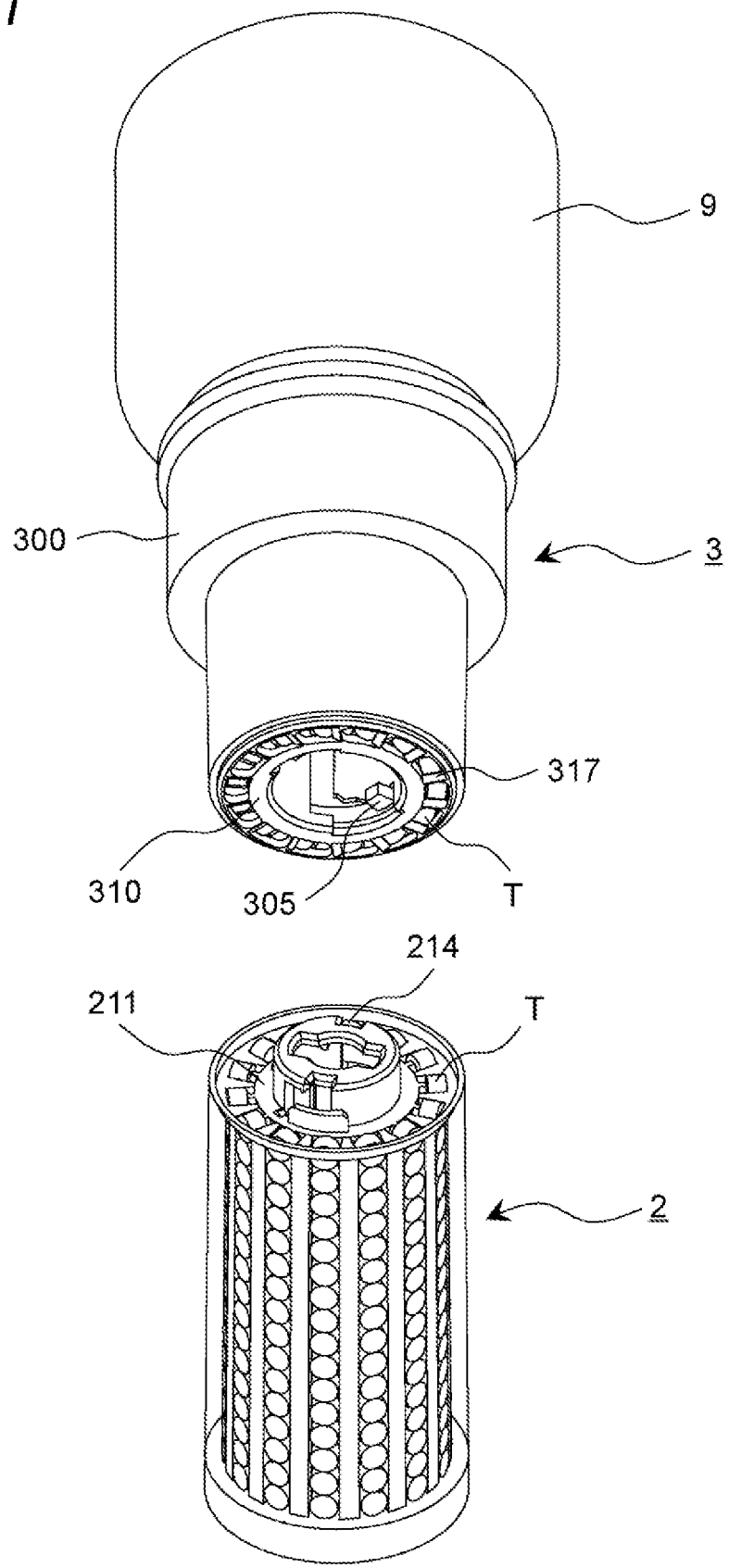
FIG. 11 is a diagram for explaining a separating operation.

After loading the tablets T into the pocket part 2, the operator separates the loading tool 3 attached to the tablet container 9 from the pocket part 2. At this time, the operator rotates the loading tool 3 counterclockwise with respect to the pocket part 2. As a result, as illustrated in FIG. 11, the guide projection 305 of the main body 300 of the loading tool 3 and the groove portion 214 of the pocket part 2 are aligned in the axial direction, and the loading tool 3 can be separated from the pocket part 2.

At the time of separation, the stoppers 317 of the opening/closing part 310 of the loading tool 3 close the paths 304 of the main body 300, and the loading tool 3 is in a closed state. Hereinafter, a mechanism where the loading tool 3 is closed by rotating the loading tool 3 counterclockwise with respect to the pocket part 2 will be described.

Figure 12:
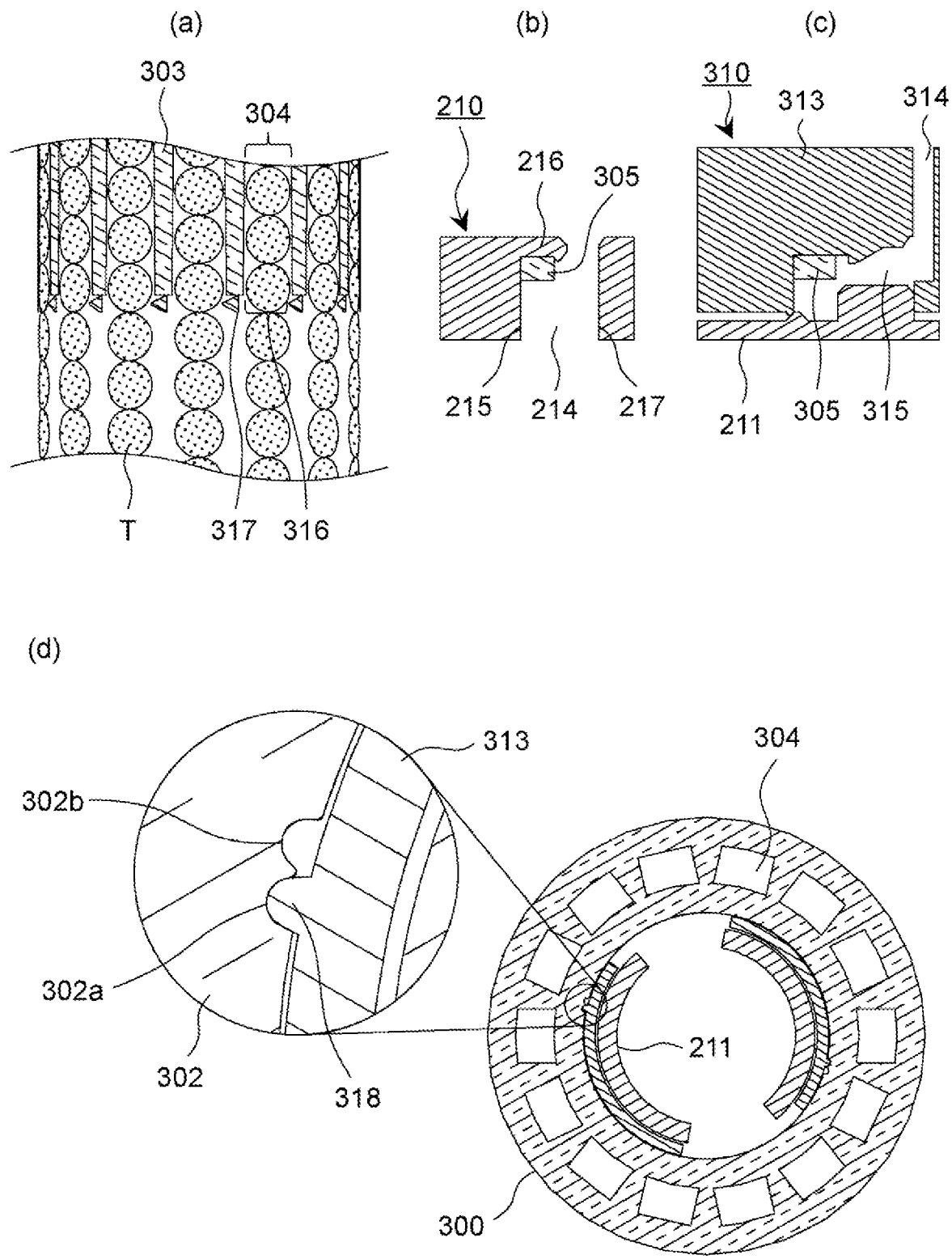
FIG. 12 is another diagram for explaining a separating operation.

FIG. 12 is a cross-sectional view of a periphery of a coupling portion between the loading tool 3 and the pocket part 2 in the open state. FIG. 12(a) is a cross-sectional view of the periphery of the coupling portion between the loading tool 3 and the pocket part 2 as viewed in the W-W direction of FIG. 9. FIG. 12(b) is a cross-sectional view of the periphery of the coupling portion between the loading tool 3 and the pocket part 2 as viewed in the Z-Z direction of FIG. 9. FIG. 12(c) is a cross-sectional view of the periphery of the coupling portion between the loading tool 3 and the pocket part 2 as viewed in the Y-Y direction of FIG. 9. FIG. 12(d) is a cross-sectional view of the pocket part 2 and the loading tool 3 in FIG. 10 as viewed in an XII-XII direction.

In the open state illustrated in FIG. 12, each path 304 of the main body 300 of the loading tool 3, each path 316 of the opening/closing part 310 of the loading tool 3, and each pocket 203 of the pocket part 2 are aligned in a straight line. In order to prevent the stoppers 317 from hindering the passage of the tablets T due to a shift in the circumferential position of the opening/closing part 310 of the loading tool 3, a mechanism for engaging and fixing the opening/closing part 310 of the loading tool 3 and the main body 300 in the open state is provided. That is, as illustrated in FIG. 12(d), a first recess 302a recessed radially outward is formed on a radially inner surface of the inner peripheral wall 302 of the main body 300 of the loading tool 3, and a projection 318 protruding radially outward is formed on a radially outer surface of the peripheral wall 313 of the opening/closing part 310 so as to engage with the first recess 302a in the open state. When the first recess 302a and the projection 318 are engaged with each other, the paths 304 of the main body 300 of the loading tool 3 and the paths 316 of the opening/closing part 310 of the loading tool 3 are aligned in straight lines in the axial direction, and the stoppers 317 of the opening/closing part 310 of the loading tool 3 do not prevent the passage of the tablets T.

In the open state, as illustrated in FIG. 12(b), the guide projection 305 of the main body 300 of the loading tool 3 is in contact with the wall surface 215 at the circumferential end of the groove portion 214 of the inner cylinder 210 of the pocket part 2.

Figure 13:
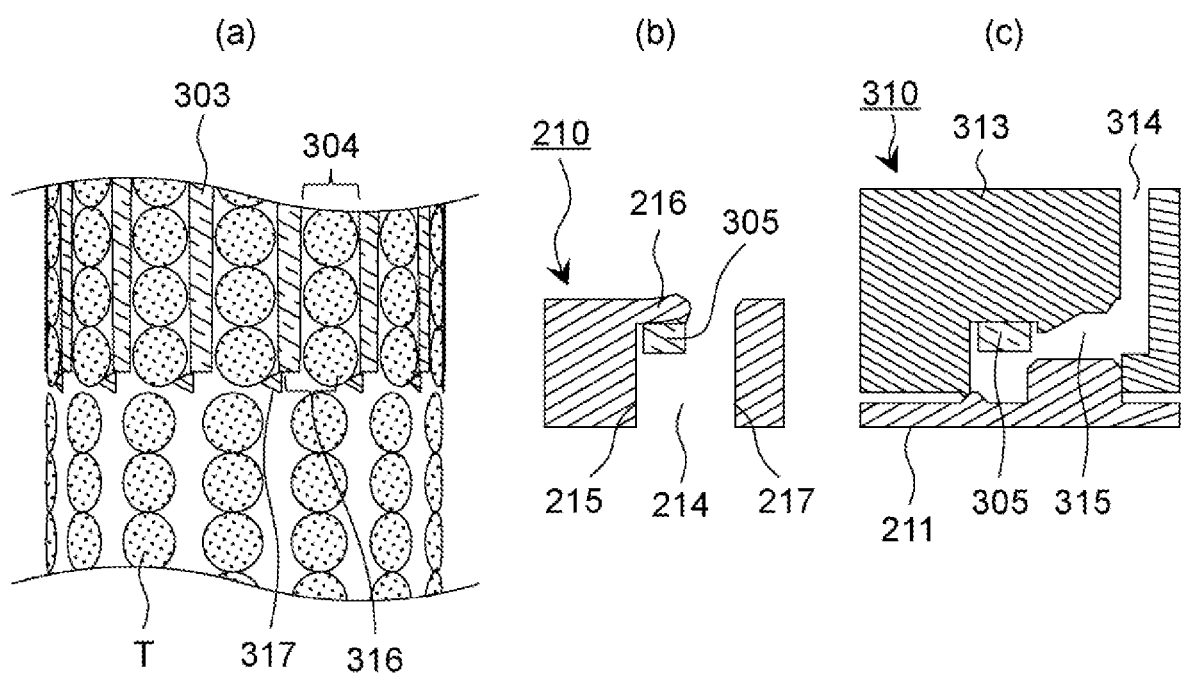
FIG. 13 is another diagram for explaining a separating operation.

FIG. 13 is a cross-sectional view illustrating a state where the loading tool 3 is rotated counterclockwise by 0.01 π [rad] with respect to the pocket part 2 from the open state illustrated in FIG. 12. FIG. 13(a) is a cross-sectional view of the periphery of the coupling portion between the loading tool 3 and the pocket part 2 as viewed in the W-W direction of FIG. 9. FIG. 13(b) is a cross-sectional view of the periphery of the coupling portion between the loading tool 3 and the pocket part 2 as viewed in the Z-Z direction of FIG. 9. FIG. 13(c) is a cross-sectional view of the periphery of the coupling portion between the loading tool 3 and the pocket part 2 as viewed in the Y-Y direction of FIG. 9.

In FIG. 13(a), the stoppers 317 of the opening/closing part 310 of the loading tool 3 are in contact with the tablets T at the lowermost ends of the paths 304 of the main body 300 of the loading tool 3. In FIG. 13(b), as compared with FIG. 12(b), the guide projection 305 of the main body 300 of the loading tool 3 is separated from the wall surface 215 at the circumferential end of the groove portion 214 of the inner cylinder 210 of the pocket part 2 and moved counterclockwise (rightward in the plane of the figure) with respect to the pocket part 2.

Figure 14:
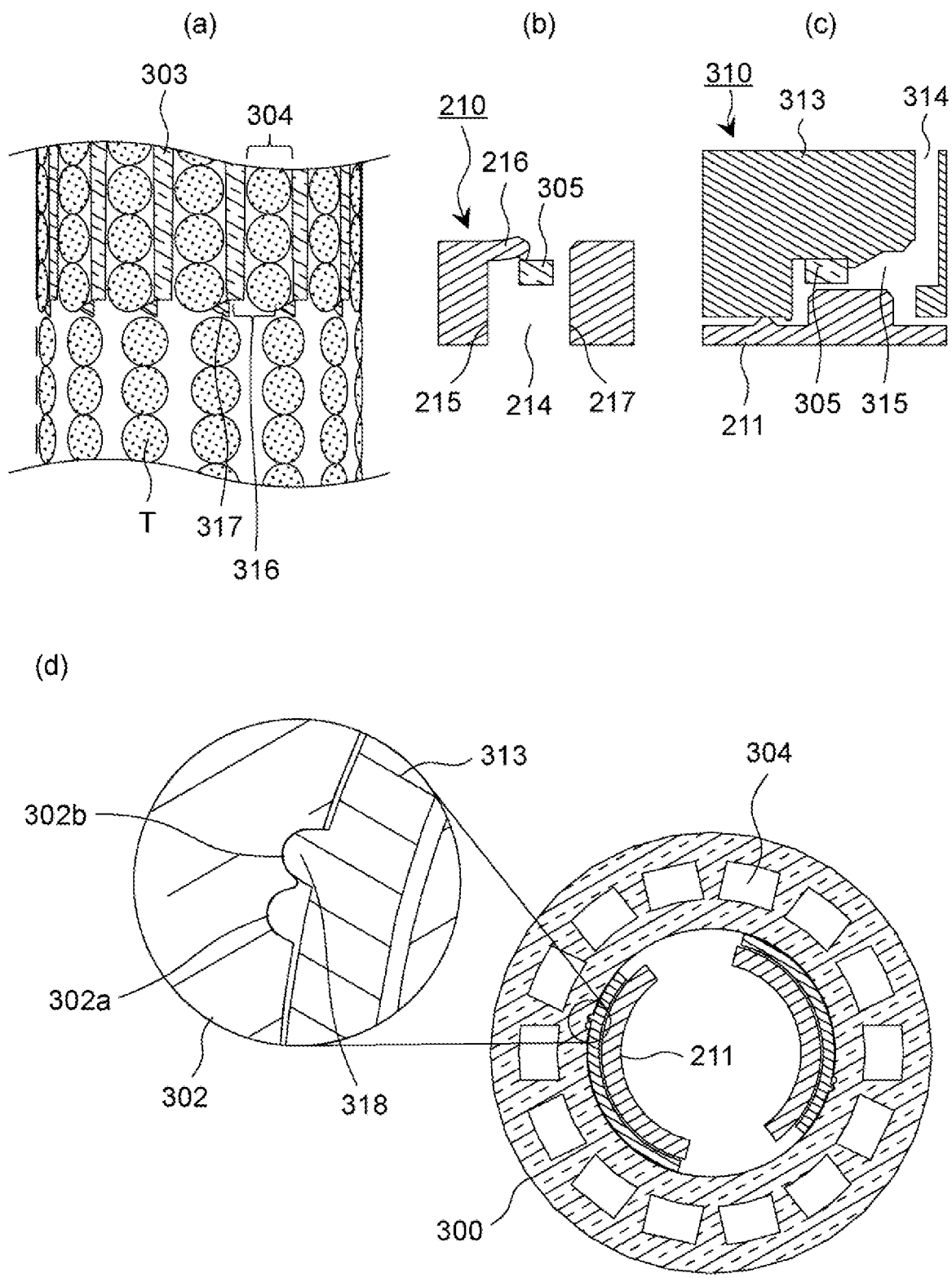
FIG. 14 is another diagram for explaining a separating operation.

FIG. 14 is a cross-sectional view illustrating a state where the loading tool 3 is rotated counterclockwise by 0.02 π [rad] with respect to the pocket part 2 from the open state illustrated in FIG. 12. FIG. 14(a) is a cross-sectional view of the periphery of the coupling portion between the loading tool 3 and the pocket part 2 as viewed in the W-W direction of FIG. 9. FIG. 14(b) is a cross-sectional view of the periphery of the coupling portion between the loading tool 3 and the pocket part 2 as viewed in the Z-Z direction of FIG. 9. FIG. 14(c) is a cross-sectional view of the periphery of the coupling portion between the loading tool 3 and the pocket part 2 as viewed in the Y-Y direction of FIG. 9. FIG. 14(d) is a cross-sectional view of the pocket part 2 and the loading tool 3 as viewed in the same direction as in FIG. 12(d).

In this state, as illustrated in FIG. 14(d), the projection 318 of the opening/closing part 310 of the loading tool 3 engages with a second recess 302b formed adjacent to the first recess 302a in the circumferential direction. As a result, each of the stoppers 317 of the opening/closing part 310 closes each corresponding path 304 of the main body 300, and prevents the tablets T from moving (falling) in the axial direction through the paths 304 of the main body 300. By rotating the loading tool 3 counterclockwise with respect to the pocket part 2 in this manner, the loading tool 3 is closed.

Figure 15:
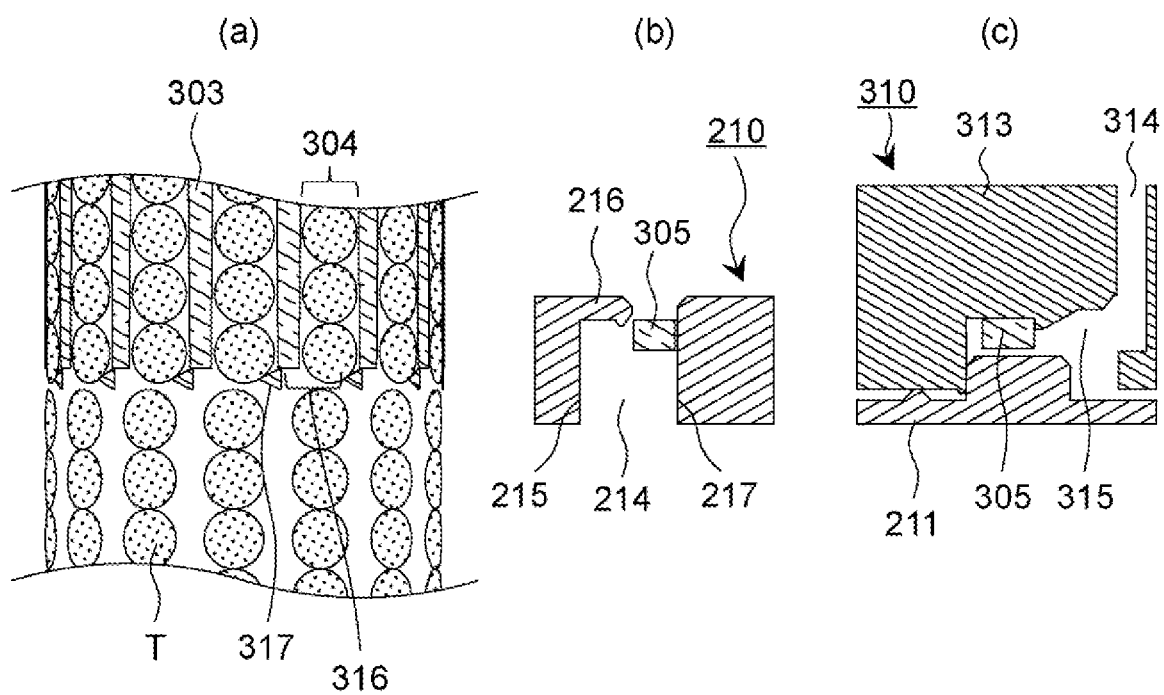
FIG. 15 is another diagram for explaining a separating operation.

FIG. 15 is a cross-sectional view illustrating a state where the loading tool 3 is rotated counterclockwise by 0.16 π [rad] with respect to the pocket part 2 from the open state illustrated in FIG. 12. The state of FIG. 15 corresponds to the above-described closed state. FIG. 15(a) is a cross-sectional view of the periphery of the coupling portion between the loading tool 3 and the pocket part 2 as viewed in the W-W direction of FIG. 9. FIG. 15(b) is a cross-sectional view of the periphery of the coupling portion between the loading tool 3 and the pocket part 2 as viewed in the Z-Z direction of FIG. 9. FIG. 15(c) is a cross-sectional view of the periphery of the coupling portion between the loading tool 3 and the pocket part 2 as viewed in the Y-Y direction of FIG. 9.

Figure 16:
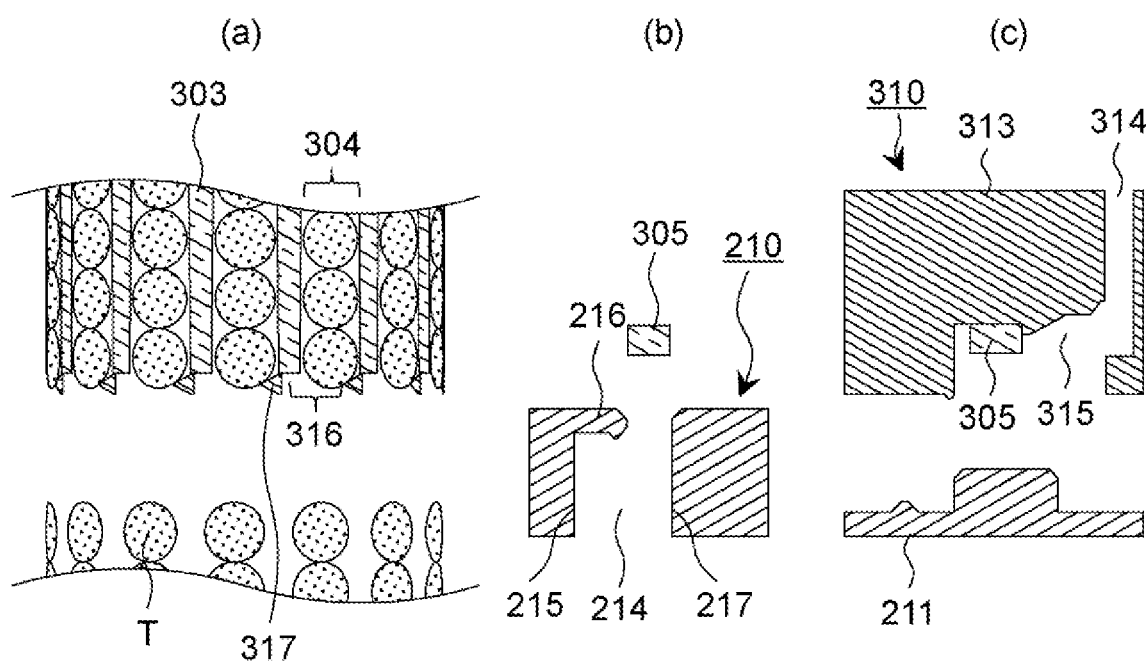
FIG. 16 is another diagram for explaining a separating operation.

In this state, as illustrated in FIG. 15(b), the guide projection 305 of the main body 300 of the loading tool 3 is in contact with a wall surface 217 facing the wall surface 215 of the inner cylinder 210 of the pocket part 2 in the circumferential direction. Since there is no protrusion 216 in the groove portion 214 of the pocket part 2 at an upper portion of the guide projection 305 of the main body 300 of the loading tool 3, the pocket part 2 can move axially upward with respect to the loading tool 3 as illustrated in FIG. 16. In this way, the loading tool 3 can be separated from the pocket part 2 without dropping the tablets T through the paths 304 of the main body 300 of the loading tool 3.

2-4. Attachment Operation of Hinge Cap

Figure 17:
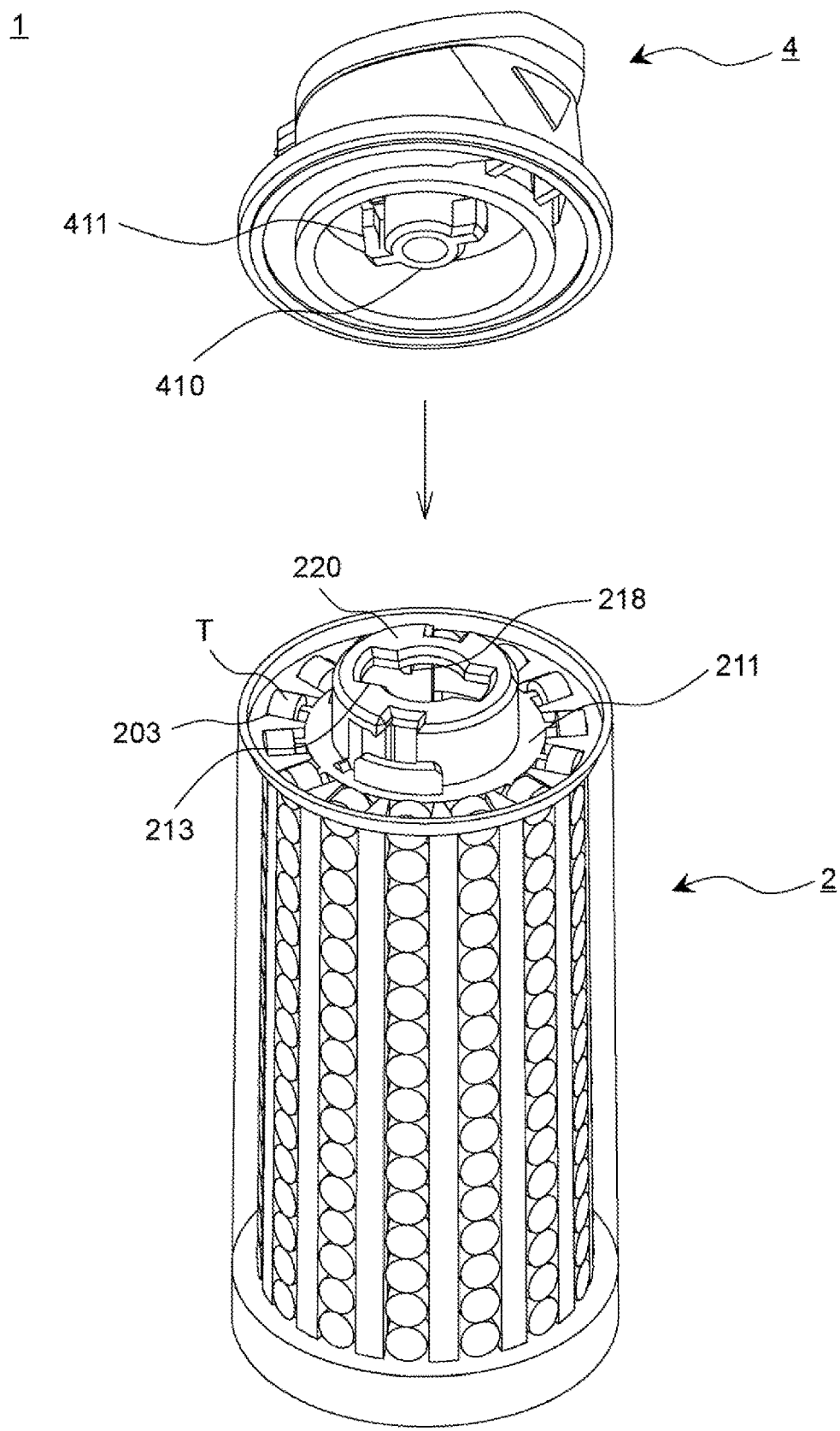
FIG. 17 is a diagram for explaining an attaching operation of a hinge cap.

After the loading tool 3 is separated from the pocket part 2, the hinge cap 4 is attached to the pocket part 2 as illustrated in FIG. 17. The operator places the hinge cap 4 from above the pocket part 2. At this time, a lower end of the joint part 410 of the hinge cap 4 is inserted into the opening 213 of the pocket part 2.

As illustrated in FIG. 17, a fixing rib 218 protruding downward is formed on a back surface of the top plate portion 220 of the pocket part 2. The fixing rib 218 extends from a radially inner surface of the peripheral wall 211. The fixing rib 218 cooperates with a fixture 411 of the joint part 410 of the hinge cap 4 to fix the hinge cap 4 so that the hinge cap 4 does not rotate counterclockwise with respect to the pocket part 2 after the hinge cap 4 is attached to the pocket part 2, as described later.

Figure 18:
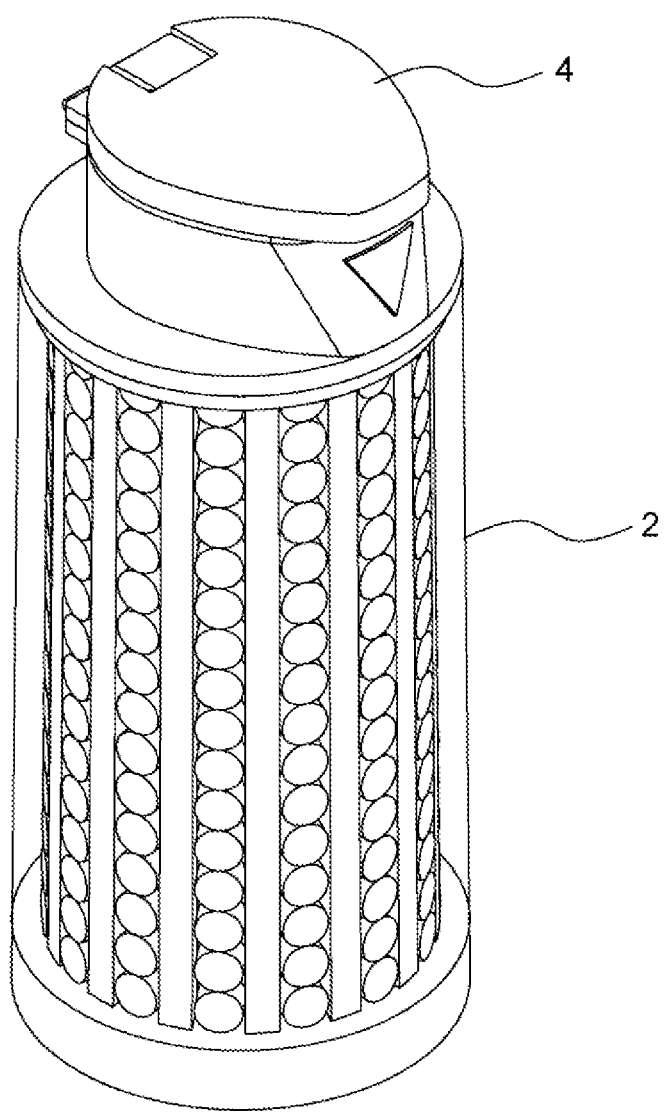
FIG. 18 is a perspective view illustrating a state where the hinge cap is covered from above the pocket part as illustrated in FIG. 17.
Figure 19:
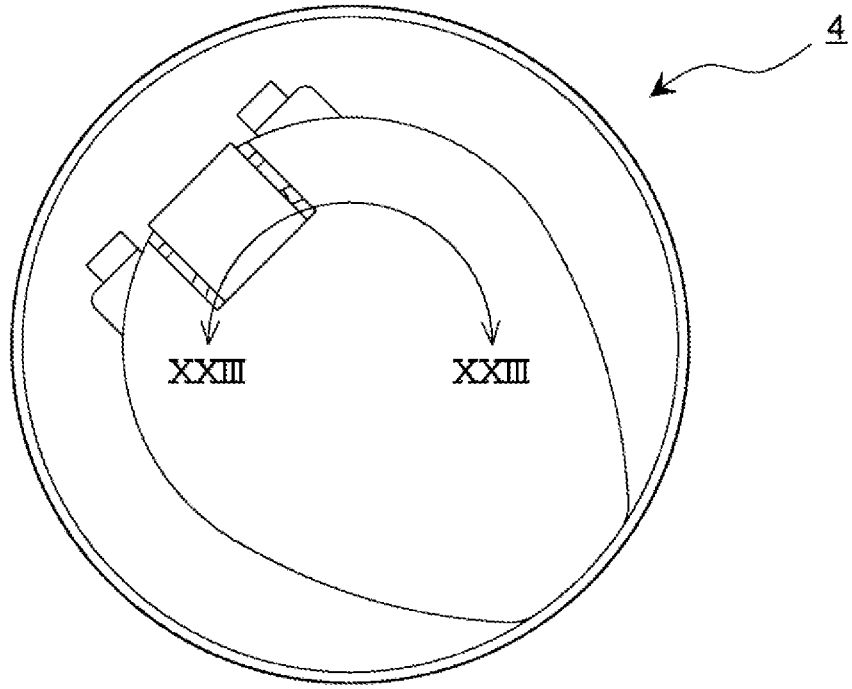
FIG. 19 is a plan view of the measuring container illustrated in FIG. 18.
Figure 20:
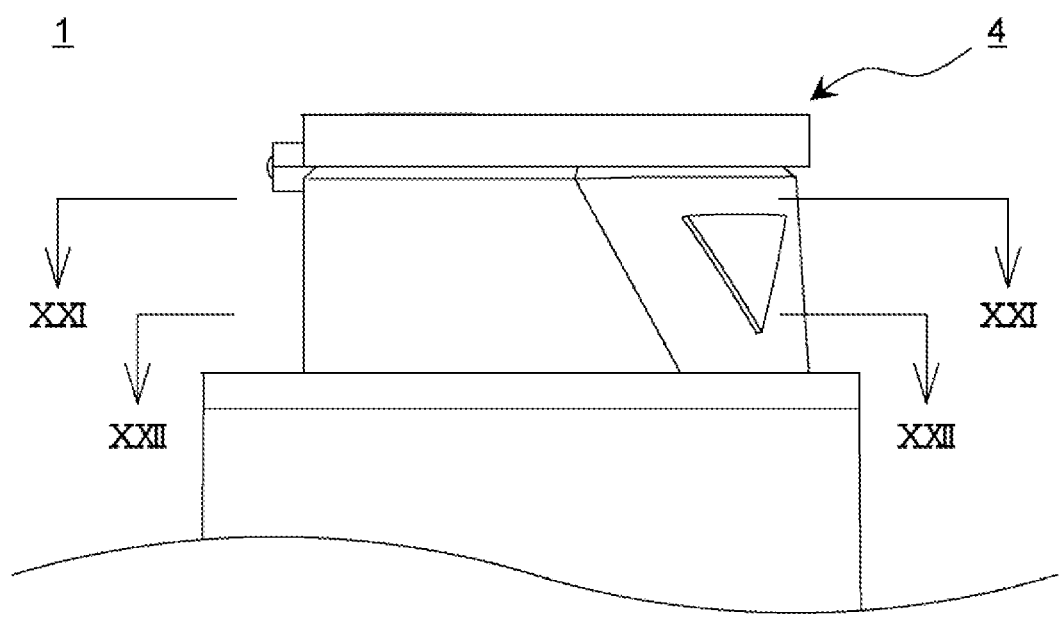
FIG. 20 is a part of a front view of the measuring container illustrated in FIG. 18.
Figure 21:
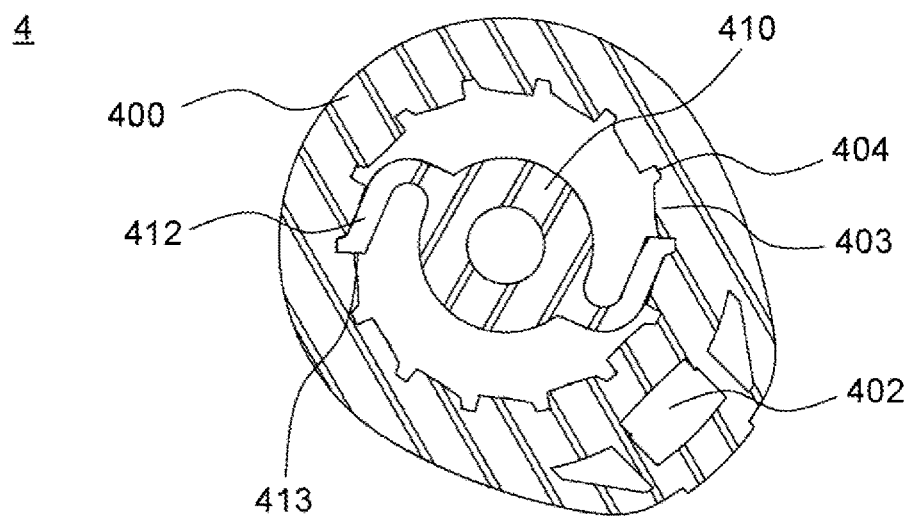
FIG. 21 is a cross-sectional view of the hinge cap 4 of FIG. 20 as viewed in an XXI-XXI direction.
Figure 22:
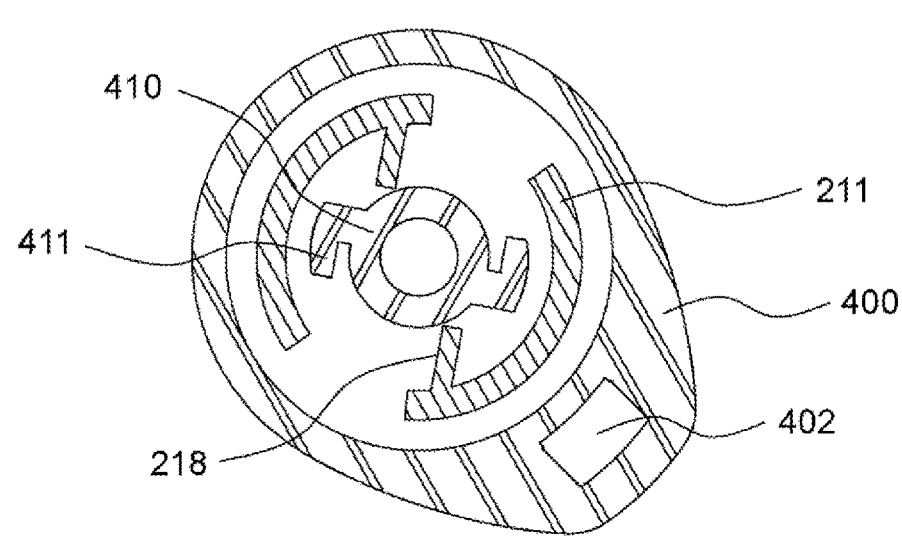
FIG. 22 is a cross-sectional view of the hinge cap 4 of FIG. 20 as viewed in an XXII-XXII direction.
Figure 23:
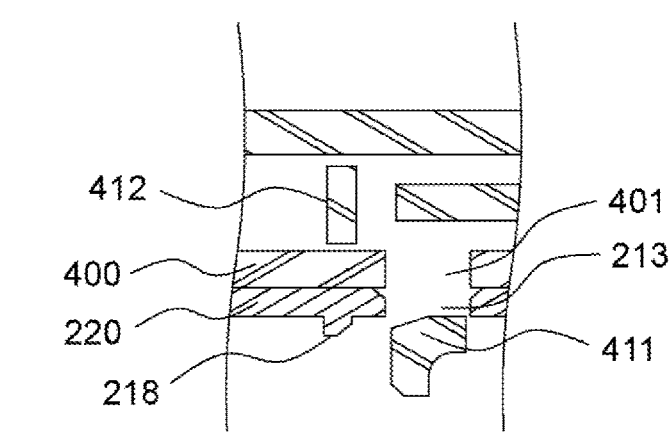
FIG. 23 is a cross-sectional view of the measuring container in FIG. 19 as viewed in an XXIII-XXIII direction.

FIG. 18 is a perspective view illustrating a state where the hinge cap 4 is placed from above the pocket part 2 as illustrated in FIG. 17. FIG. 19 is a plan view of the measuring container 1 illustrated in FIG. 18. FIG. 20 is a part of a front view of the measuring container 1 illustrated in FIG. 18. FIG. 21 is a cross-sectional view of the hinge cap 4 of FIG. 20 as viewed in an XXI-XXI direction. FIG. 22 is a cross-sectional view of the hinge cap 4 of FIG. 20 as viewed in an XXII-XXII direction. FIG. 23 is a cross-sectional view of the measuring container 1 in FIG. 19 as viewed in an XXIII-XXIII direction.

Figure 24:
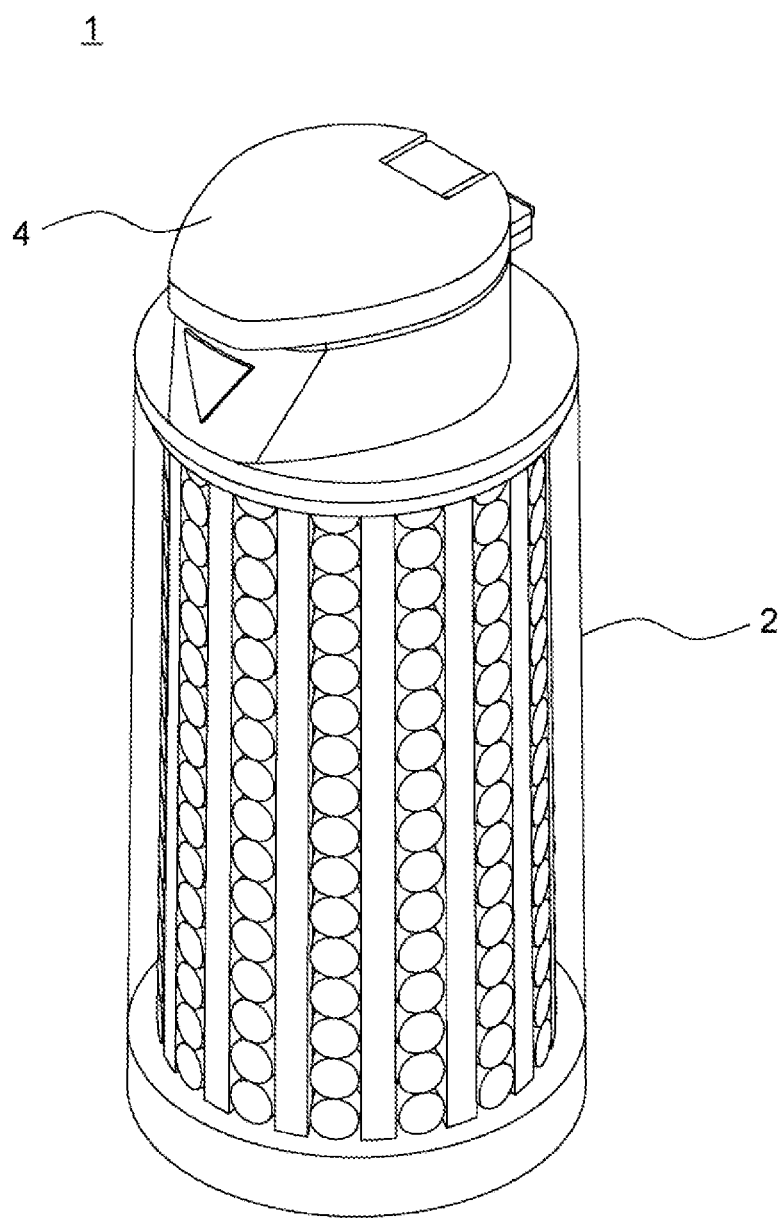
FIG. 24 is a perspective view illustrating a state of the measuring container after the hinge cap 4 is rotated clockwise by 90° with respect to the pocket part 2 from a state of FIG. 19.
Figure 25:
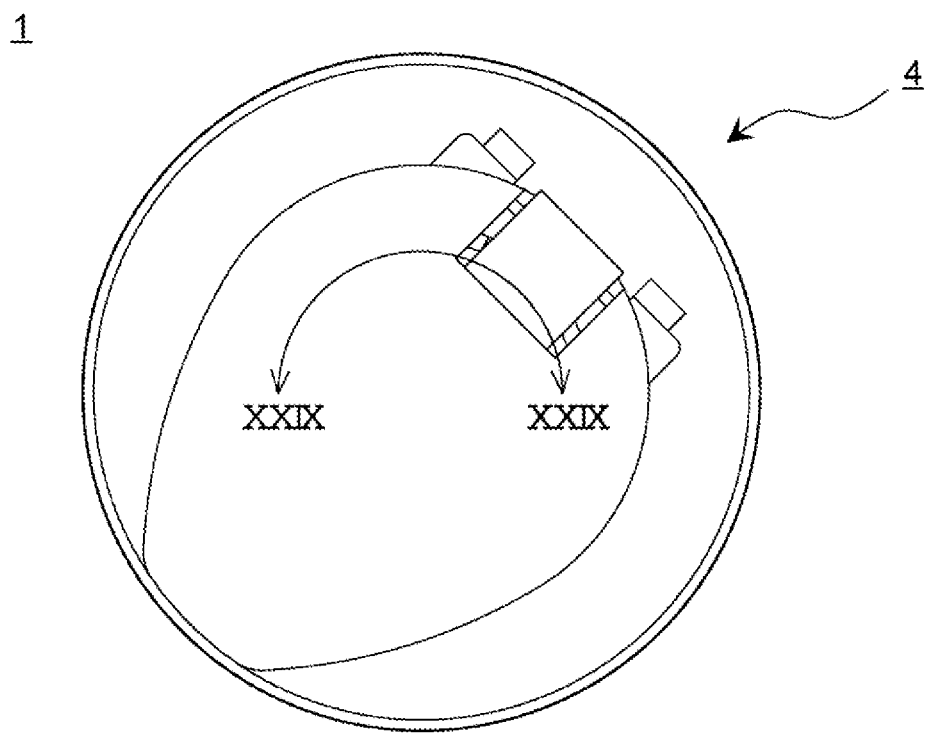
FIG. 25 is a plan view of the measuring container illustrated in FIG. 24.
Figure 26:
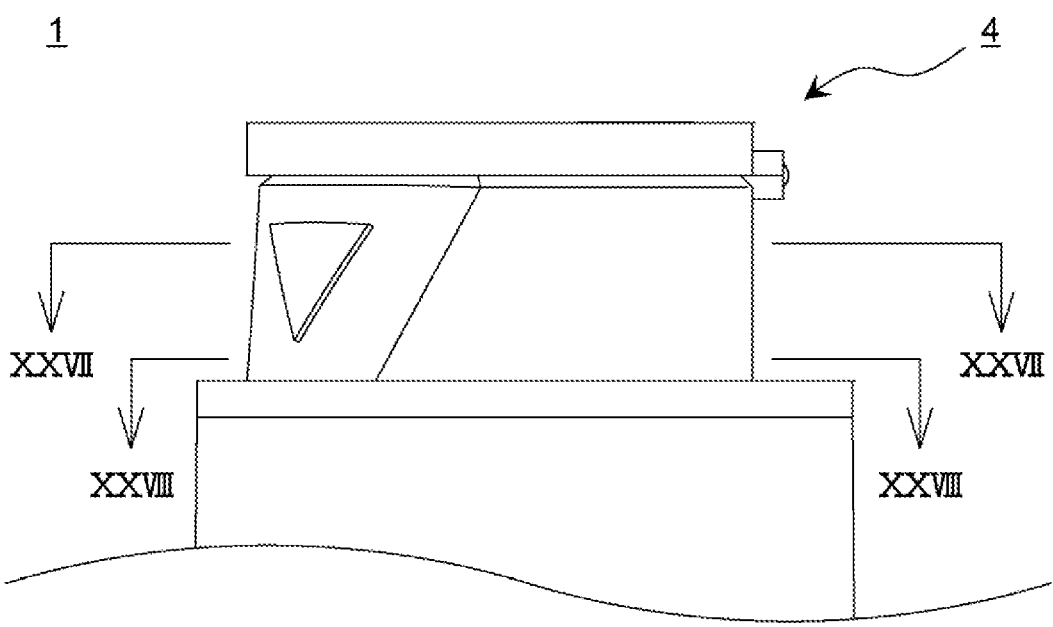
FIG. 26 is a part of a front view of the measuring container illustrated in FIG. 24.
Figure 27:
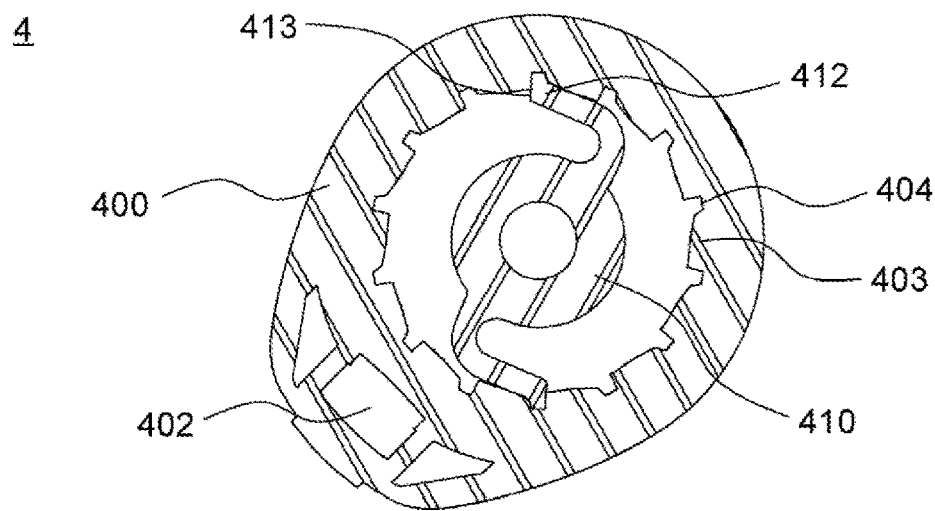
FIG. 27 is a cross-sectional view of the hinge cap 4 of FIG. 26 as viewed in an XXVII-XXVII direction.
Figure 28:
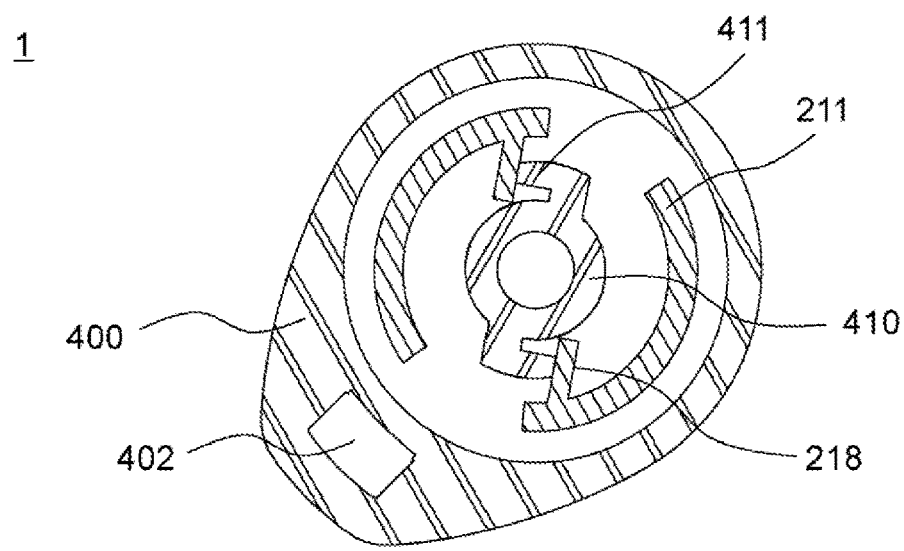
FIG. 28 is a cross-sectional view of the hinge cap 4 of FIG. 26 as viewed in an XXVIII-XXVIII direction.
Figure 29:
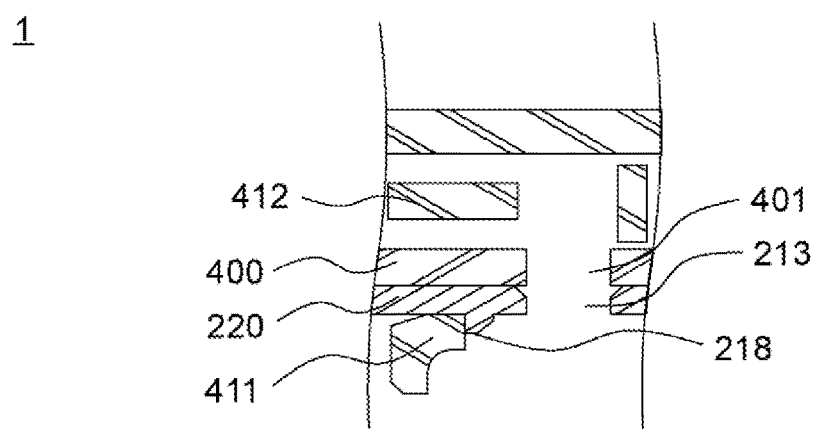
FIG. 29 is a cross-sectional view of the measuring container in FIG. 25 as viewed in an XXIX-XXIX direction.

After covering the pocket part 2 with the hinge cap 4 from above, the operator rotates the hinge cap 4 clockwise by 90° with respect to the pocket part 2. FIG. 24 is a perspective view illustrating a state of the measuring container 1 after the hinge cap 4 is rotated clockwise by 90° with respect to the pocket part 2 from a state of FIG. 19. FIG. 25 is a plan view of the measuring container 1 illustrated in FIG. 24. FIG. 26 is a part of a front view of the measuring container 1 illustrated in FIG. 24. FIG. 27 is a cross-sectional view of the hinge cap 4 of FIG. 26 as viewed in an XXVII-XXVII direction. FIG. 28 is a cross-sectional view of the hinge cap 4 of FIG. 26 as viewed in an XXVIII-XXVIII direction. FIG. 29 is a cross-sectional view of the measuring container 1 in FIG. 25 as viewed in an XXIX-XXIX direction.

As can be seen with reference to FIG. 27, when the operator applies a force to the main body 400 of the hinge cap 4 to rotate the hinge cap 4 clockwise, a circumferential end of each protrusion 403 of the main body 400 pushes an end 413 of each claw 412 of the joint part 410. Thus, the clockwise force is also transmitted to the joint part 410, and the joint part 410 also rotates with the main body 400.

Comparing FIG. 23 with FIG. 29, the fixture 411 of the joint part 410 of the hinge cap 4 rotates clockwise, and moves leftward when looking into the paper surface of FIG. 23 and FIG. 29. In FIG. 29, the fixture 411 of the joint part 410 of the hinge cap 4 climbs over the fixing rib 218 of the pocket part 2 (see also FIG. 28). Therefore, even if the main body 400 of the hinge cap 4 is subsequently rotated counterclockwise with respect to the pocket part 2, the joint part 410 does not rotate counterclockwise with respect to the pocket part 2 because the fixture 411 of the joint part 410 of the hinge cap 4 and the fixing rib 218 of the pocket part 2 are in contact with each other.

2-5. Use Operation

The measuring container 1 illustrated in FIGS. 24 to 29 is handed over from an operator such as a doctor or a pharmacist to a user such as a consumer or a patient, and is used by the user.

In the measuring container 1 illustrated in FIGS. 24 to 29, when a counterclockwise force is applied to the main body 400 of the hinge cap 4 with respect to the pocket part 2, the main body 400 rotates counterclockwise. On the other hand, since the joint part 410 is fixed to the pocket part 2, the joint part 410 does not rotate. In this manner, the joint part 410 does not rotate with respect to the pocket part 2, and only the main body 400 rotates counterclockwise.

When each claw 412 of the joint part 410 of the hinge cap 4 is engaged into one of the grooves 404 of the main body 400 as illustrated in FIG. 27, the path 402 and one of the pockets 203 of the pocket part 2 are aligned in a straight line. Therefore, the tablets T stored in the pocket part 2 can exit to the outside via the path 402.

When the main body 400 of the hinge cap 4 is rotated counterclockwise with respect to the pocket part 2, a click feeling can be obtained and/or a click sound can be heard when the claws 412 of the joint part 410 climb over the protrusions 403 of the main body 400 and are engaged into the grooves 404. This is because each of the claws 412 of the joint part 410 functions as a leaf spring. Thus, the user can easily align the claw 412 of the joint part 410 of the hinge cap 4 with the groove 404 of the main body 400.

Figure 30:
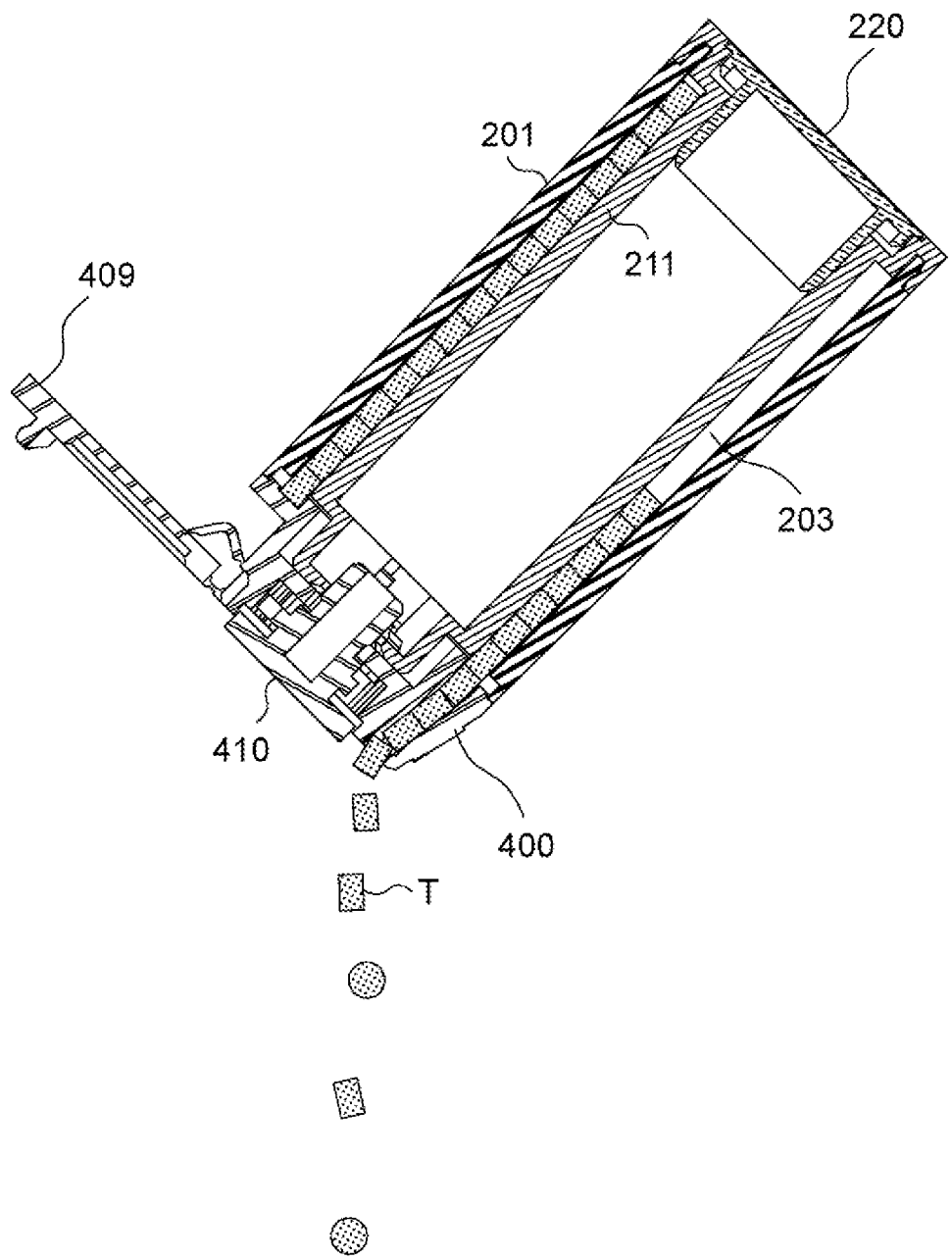
FIG. 30 is a diagram for describing a use operation.

After aligning and engaging the claws 412 of the joint part 410 of the hinge cap 4 with the grooves 404 of the main body 400, the user opens the cap portion 409 of the hinge cap 4 and then inverts the measuring container 1 to take out the tablets T from one of the pockets 203 of the pocket part 2, as illustrated in FIG. 30.

After dispensing the tablets T, the user closes the cap portion 409 of the hinge cap 4, rotates the main body 400 of the hinge cap 4 counterclockwise with respect to the pocket part 2, and moves the mark 406 displayed on the main body 400 of the hinge cap 4 to an upper portion of a next pocket 203 of the pocket part 2.

Figure 31:
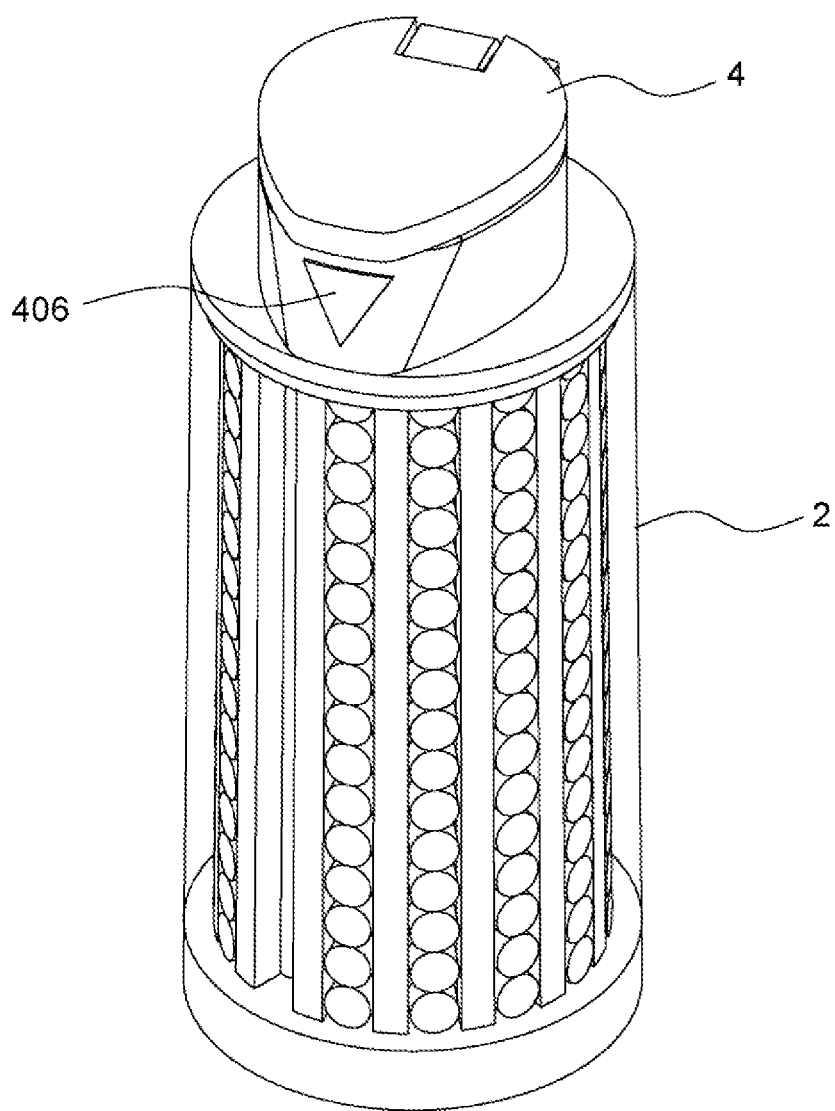
FIG. 31 is another diagram for describing the use operation.
Figure 32:
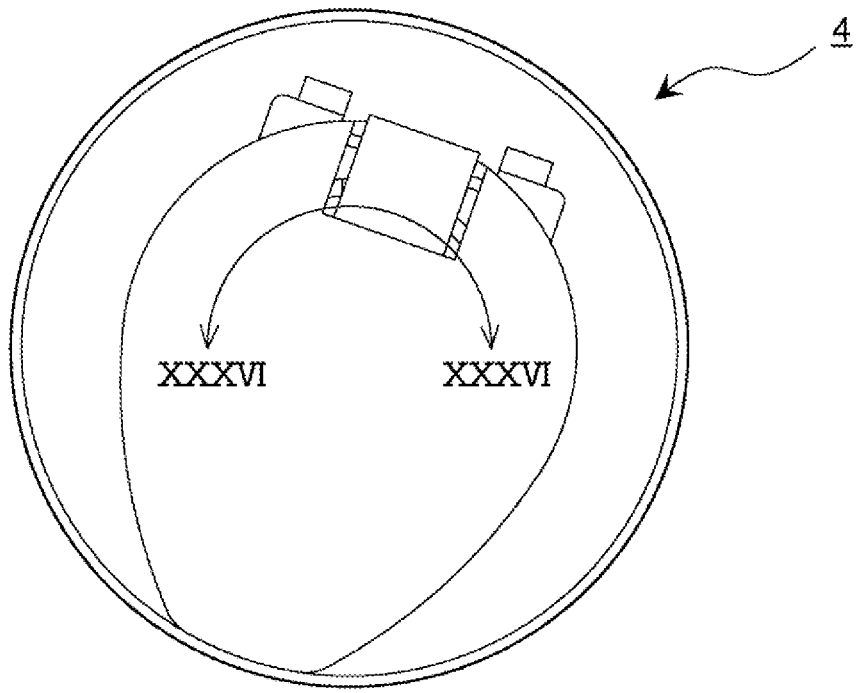
FIG. 32 is another diagram for describing the use operation.
Figure 33:
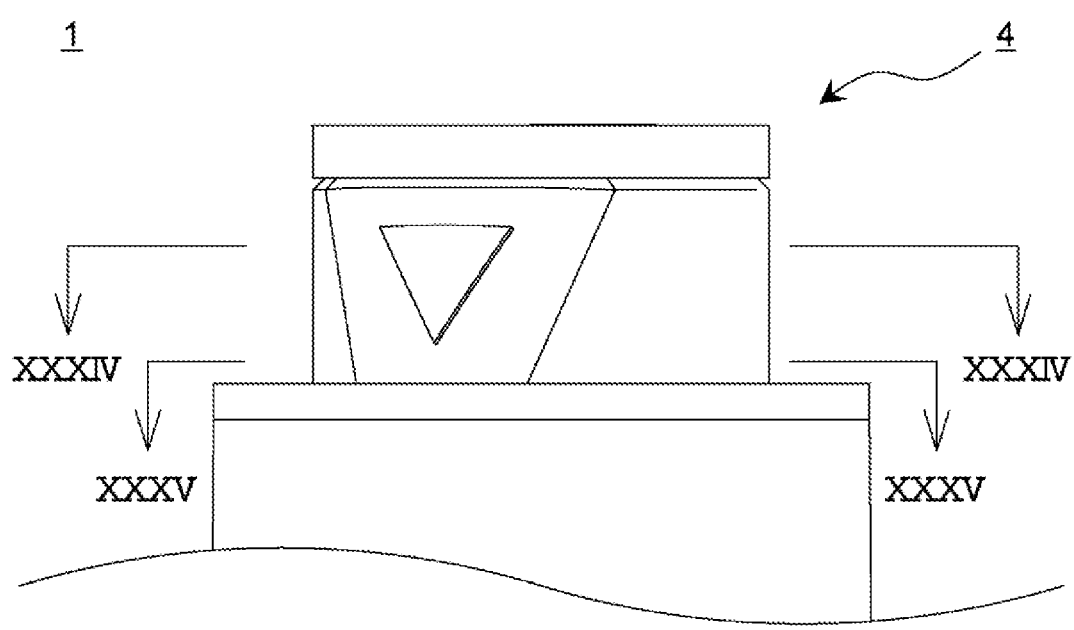
FIG. 33 is another diagram for describing the use operation.
Figure 34:
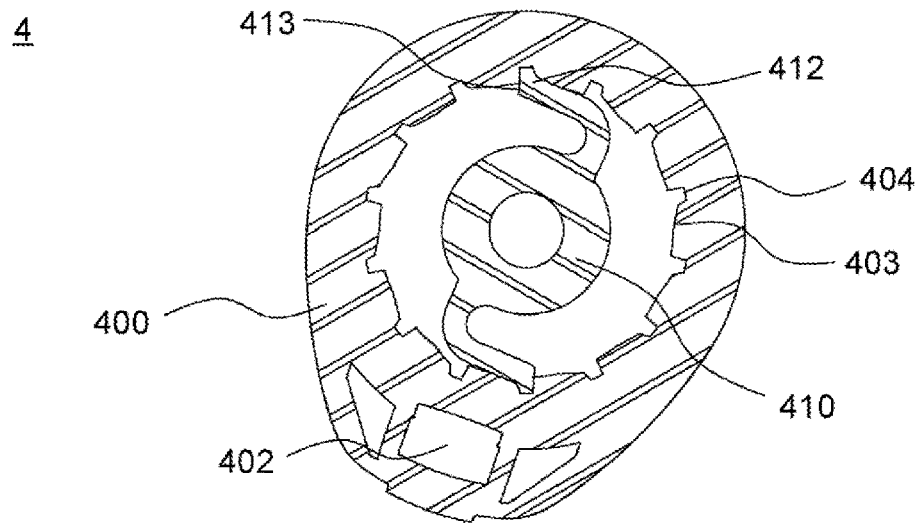
FIG. 34 is another diagram for describing the use operation.
Figure 35:
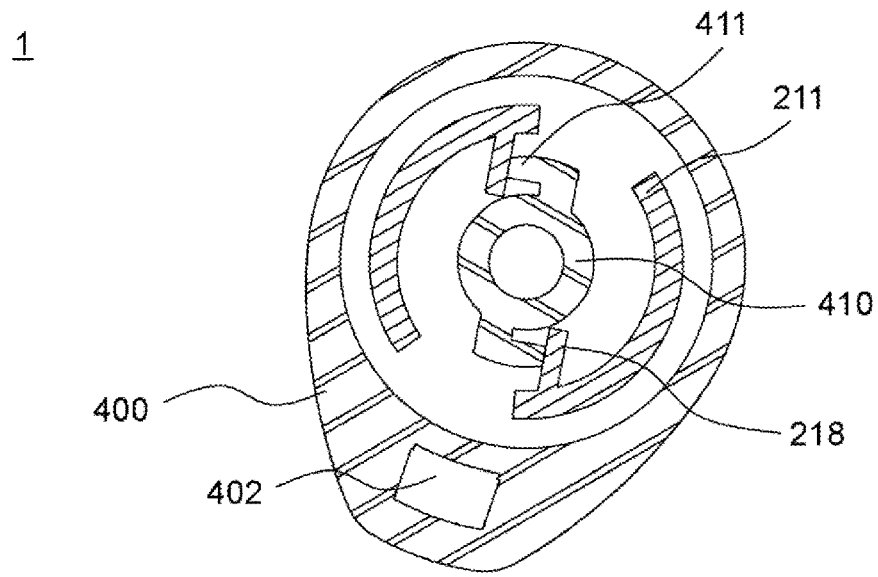
FIG. 35 is another diagram for describing the use operation.
Figure 36:
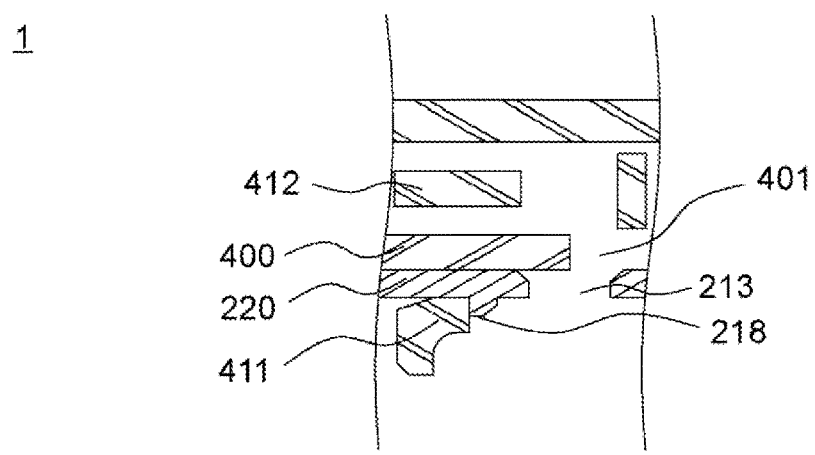
FIG. 36 is another diagram for describing the use operation.

FIG. 31 is a perspective view illustrating the measuring container 1 in a state where the mark 406 is moved to the upper portion of the next pocket 203 of the pocket part 2 in this manner. FIG. 32 is a plan view of the measuring container 1 illustrated in FIG. 31. FIG. 33 is a part of a front view of the measuring container 1 illustrated in FIG. 32. FIG. 34 is a cross-sectional view of the hinge cap 4 of FIG. 33 as viewed in an XXXIV-XXXIV direction. FIG. 35 is a cross-sectional view of the hinge cap 4 of FIG. 33 as viewed in an XXXV-XXXV direction. FIG. 36 is a cross-sectional view of the measuring container 1 of FIG. 32 as viewed in the XXXVI-XXXVI direction.

As compared with FIGS. 25 to 29, in the state illustrated in FIGS. 32 to 36, the main body 400 of the hinge cap 4 rotates counterclockwise, and referring particularly to FIGS. 34 and 35, it can be seen that the path 402 of the main body 400 moves. On the other hand, as can be seen with reference to FIGS. 31 and 34 to 36, the joint part 410 of the hinge cap 4 and the pocket part 2 are not rotated.

3. EFFECTS AND THE LIKE

As described above, the measuring container 1 according to the present embodiment includes the pocket part 2 including the 14 pockets 203 each capable of storing 16 tablets, and the hinge cap 4 attached to the pocket part 2. The hinge cap 4 includes a second path 402. The tablets can pass through the second path 402 from one end to the outside. One end of the second path 402 of the hinge cap 4 is connected to the outside, and the other end is selectively connected to one of storage sections 203.

For example, pockets 203 of the pocket part 2 are arranged in the circumferential direction around the central axis C. Each of the pockets 203 has a dimension for 16 tablets arranged in a row in the axial direction to be accommodated.

With the measuring container 1 having such a configuration, the user can take out a predetermined number of tablets, for example, 16 tablets at a time. When the measuring container 1 is inverted, the 16 tablets come out from the second path 402 of the hinge cap 4, so that it is not necessary for the user to count the tablets. The pocket part 2 has 14 pockets 203. Thus, the pocket part 2 can store 14 doses of tablets without additional tablet loading. For example, the pocket part 2 can store tablets corresponding to doses when taking tablets twice a day, in the morning and at night, continuously for one week.

The loading tool 3 is used for loading tablets into the measuring container 1. The loading tool 3 includes first paths 304 to be connected to the pockets 203 of the pocket part 2 so that the tablets from the outside can pass therethrough. The loading tool 3 is detachably attached to the storage container 2.

The loading tool 3 may further include an opening/closing part 310 that switches between an open state allowing a tablet from the outside to pass through the first paths 304 and a closed state not allowing a tablet from the outside to pass through the first paths 304. For example, the opening/closing part 310 is closed by an operation of detaching the loading tool 3 from the pocket part 2.

With such a configuration, the loading tool 3 can be separated from the pocket part 2 without dropping the tablets T through the paths 304 of the main body 300 of the loading tool 3.

The loading tool 3 may be detachably attached to the tablet container 9. In this case, the pockets 203 of the pocket part 2 are connected to an inside of the tablet container 9 via the first paths 304 of the loading tool 3.

With such a configuration, the operator such as a doctor or a pharmacist can load tablets into the pockets 203 of the pocket part 2 by a simple operation. For example, the operator can load the tablets T inside the tablet container 9 into the pockets 203 of the pocket part 2 by only assembling the pocket part 2, the loading tool 3, and the tablet container 9 and then inverting them. As a result, it is possible to reduce time and effort of the operator for sorting a large number of tablets for each dose.

The first paths 304 of the loading tool 3 have the same number of openings as the plurality of pockets 203 arranged in the circumferential direction around the central axis C, and axially overlaps the pockets 203 when attached to the pocket part 2. The opening/closing part 310 of the loading tool 3 may have a same number of third paths 316 as the plurality of pockets 203 arranged in the circumferential direction around the central axis C, and stoppers 317 between the third paths 316 adjacent in the circumferential direction. For example, the opening/closing part 310 of the loading tool 3 rotates about the central axis C by the operation of detaching the loading tool 3 from the pocket part 2, and closes the first paths 304 by arranging the stoppers 317 adjacent to the first paths 304 in the axial direction.

The measuring container 1 (the pocket part 2 and the hinge cap 4) and the loading tool 3 according to the present embodiment are sold as, for example, a measuring container kit. The operator such as a doctor or a pharmacist purchases the measuring container kit and loads tablets T into the pocket part 2 using the loading tool 3. Next, the operator removes the loading tool 3 from the pocket part 2, attaches the hinge cap 4 to the pocket part 2, and hands it over to a user such as a patient.

4. MODIFICATIONS

The embodiments of the present invention have been described above. However, the above description is an example of the present invention, and the embodiments of the present invention can be improved and modified without departing from the scope of the present invention.

4-1. Modification 1

Figure 37:
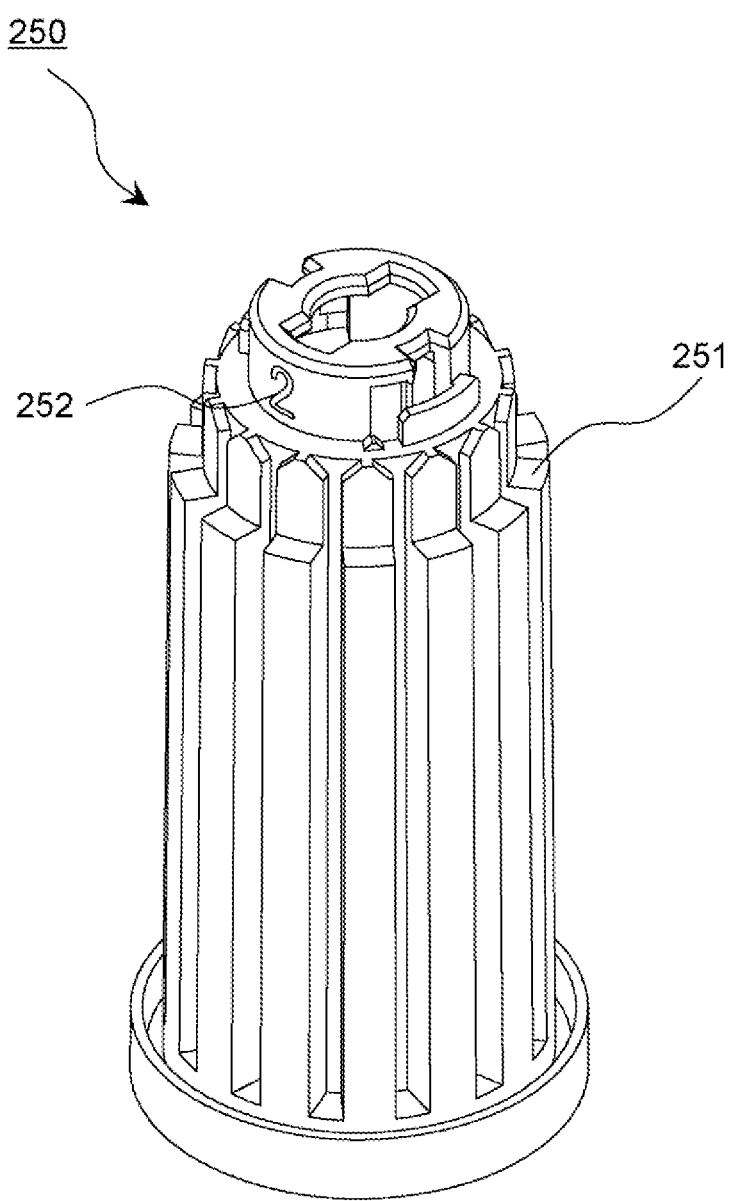
FIG. 37 is a perspective view illustrating an inner cylinder of a pocket part according to modification example 1 of the present embodiment.

In the above embodiment, the pocket part 2 storing 16 tablets in each pocket 203 (see FIG. 3) has been described. However, the number of tablets stored in each pocket 203 is not limited to this, and may be one or more. FIG. 37 is a perspective view illustrating an inner cylinder 250 of the pocket part 2 designed to store two tablets in each pocket 203 (see FIG. 3). The inner cylinder 250 has bottom surfaces 251. Each of the bottom surfaces 251 is raised as compared with those of the inner cylinder 210 illustrated in FIG. 3. The distance between the top of a pocket 203 and a bottom surface 251 is, for example, approximately equal to a diameter of the tablet multiplied by two.

On a surface near the upper end of the inner cylinder 250, a tablet number mark 252 indicating "2", that is, the number of tablets stored in one pocket 203, is displayed.

In this way, if inner cylinders corresponding to various numbers of tablets to be stored in the pocket 203 are prepared, for example, the number of doses according to each patient can be supported only by connecting a new inner cylinder corresponding to a different number of tablets to the outer cylinder.

4-2. Modification 2

In the above embodiment, the loading tool 3 detachably attached to the tablet container 9 has been described. However, the loading tool 3 is not limited to one detachably attached to the tablet container 9. For example, the operator may fill the pocket part 2 with the tablets by pouring the tablets into the loading tool 3.

The invention claimed is:

1. A loading tool comprising:
   a first connector detachably attached to a storage container of a measuring container for dispensing a plurality of predetermined contents; and
   a loading path:
   wherein
   the measuring container comprises:
      the storage container having storage sections each capable of storing the plurality of predetermined contents; and
      a storage section selector having a take-out path which selectively connects one of the storage sections to an outside of the measuring container;
   each of the storage sections extends in an axial direction parallel to a central axis and the storage sections are arranged in a circumferential direction around the central axis,
   the storage container includes an outer cylinder and an inner cylinder, the inner cylinder being disposed radially inward from the outer cylinder and detachably attached to the outer cylinder,
   the storage sections are formed between the outer cylinder and the inner cylinder by disposing the inner cylinder radially inward of the outer cylinder, and
   the loading path connects the storage sections with the outside of the measuring container when the loading tool is attached to the storage container through the first connector.

2. The loading tool according to claim 1, wherein:
   the outer cylinder includes a plurality of ribs each protruding radially inward from a radially inner surface of the outer cylinder and extending in the axial direction;
   the inner cylinder includes a plurality of grooves extending in the axial direction; and
   the plurality of ribs and the plurality of grooves engage with each other and thereby the storage sections are formed between the ribs in the circumferential direction.

3. The loading tool according to claim 1, wherein:
the loading tool further comprises an opening/closing part configured to switch between an open state allowing the contents to pass through the loading path and a closed state not allowing the contents to pass through the loading path; and
the opening/closing part is switched from the open state to the closed state by an operation of detaching the loading tool from the storage container.

4. The loading tool according to claim 3, wherein:
the opening/closing part includes a stopper configured to be rotatable about the central axis and arranged between the loading path and the storage sections when the loading tool is attached to the storage container;
the stopper rotates to be arranged in a closing position when the loading tool is detached from the storage container, wherein the stopper closes the loading path in the closing position; and
the stopper rotates to leave from the closing position when the loading tool is attached to the storage container.

5. The loading tool according to claim 1, further comprising a second connector, wherein:
the loading tool is detachably attached to a contents container, by the second connector, that stores the contents before being stored in the measuring container; and
the storage sections of the storage container are connected to the contents container via the loading path when the loading tool is attached to the contents container.

6. A measuring container kit comprising:
a measuring container for dispensing a plurality of predetermined contents, the measuring container comprising:
   a storage container having storage sections each capable of storing the plurality of predetermined contents; and
   a storage section selector having a take-out path which selectively connects one of the storage sections to an outside of the measuring container;
wherein
   each of the storage sections extends in an axial direction parallel to a central axis and the storage sections are arranged in a circumferential direction around the central axis,
   the storage container includes an outer cylinder and an inner cylinder, the inner cylinder being disposed radially inward from the outer cylinder and detachably attached to the outer cylinder, and
   the storage sections are formed between the outer cylinder and the inner cylinder by disposing the inner cylinder radially inward of the outer cylinder; and
a loading tool comprising:
   a first connector detachably attached to the storage container of the measuring container; and
   a loading path that connects the storage sections with the outside of the measuring container when the loading tool is attached to the storage container through the first connector.

* * * * *